United States Patent
Drugge et al.

(10) Patent No.: US 11,251,830 B2
(45) Date of Patent: Feb. 15, 2022

(54) MEASUREMENTS FOR FREQUENCY HOPPING SYSTEMS

(71) Applicant: TELEFONAKTIEBOLAGET LM ERICSSON (PUBL), Stockholm (SE)

(72) Inventors: Oskar Drugge, Hjärup (SE); Emma Wittenmark, Lund (SE); David Sugirtharaj, Lund (SE); Peter Alriksson, Hörby (SE); Yusheng Liu, Lund (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 205 days.

(21) Appl. No.: 16/476,546

(22) PCT Filed: Dec. 7, 2017

(86) PCT No.: PCT/IB2017/057742
§ 371 (c)(1),
(2) Date: Jul. 8, 2019

(87) PCT Pub. No.: WO2018/134659
PCT Pub. Date: Jul. 26, 2018

(65) Prior Publication Data
US 2021/0159940 A1    May 27, 2021

Related U.S. Application Data
(60) Provisional application No. 62/448,815, filed on Jan. 20, 2017.

(51) Int. Cl.
*H04B 1/713*    (2011.01)
*H04B 1/7143*   (2011.01)
(Continued)

(52) U.S. Cl.
CPC .......... *H04B 1/7143* (2013.01); *H04L 5/005* (2013.01); *H04L 5/0035* (2013.01); *H04W 24/10* (2013.01);
(Continued)

(58) Field of Classification Search
CPC ..... H04B 1/7143; H04L 5/005; H04L 5/0035; H04W 24/10; H04W 72/082; H04W 74/0816
See application file for complete search history.

(56) References Cited

U.S. PATENT DOCUMENTS 10,178,568 B2 *   1/2019  Yi ........................ H04B 17/327
2011/0317656 A1 * 12/2011 Rajih .................... H04L 5/0048
                                                             370/330

(Continued)

OTHER PUBLICATIONS

Author Unknown, "Technical Specification Group Radio Access Network; Study on provision of low-cost Machine-Type Communications (MTC) User Equipments (UEs) based on LTE (Release 12)," Technical Report 36.888, Verson 12.0.0, Jun. 2013, 3GPP Organizational Partners, 55 pages.

(Continued)

*Primary Examiner* — Siu M Lee
(74) *Attorney, Agent, or Firm* — Withrow & Terranova, PLLC

(57) ABSTRACT

A method (1100) in a wireless device (110) comprises identifying (1104) a configuration of a coordinated measurement occasion. The method comprises, during the coordinated measurement occasion (530, 630, 710, 830, 930), performing (1108) one or more measurements with respect to a plurality of reference signals transmitted from different cells (125, 515, 520, 525, 615, 620, 625, 715, 720, 725, 815, 820, 825, 915, 920, 925), in accordance with the identified configuration, wherein: each of the different cells is associated with at least one of the plurality of reference signals;

(Continued)

and the configuration defines a common time interval and one or more common frequencies for the different cells to transmit their respective associated reference signal during the coordinated measurement occasion.

43 Claims, 23 Drawing Sheets

(51) Int. Cl.
  *H04L 5/00* (2006.01)
  *H04W 24/10* (2009.01)
  *H04W 72/08* (2009.01)
  *H04W 74/08* (2009.01)

(52) U.S. Cl.
  CPC ...... *H04W 72/082* (2013.01); *H04W 74/0816* (2013.01)

(56) References Cited

U.S. PATENT DOCUMENTS

| | | |
|---|---|---|
| 2016/0227424 A1 | 8/2016 | Chen et al. |
| 2016/0262000 A1 | 9/2016 | Koorapaty et al. |
| 2016/0344526 A1 | 11/2016 | Fan et al. |
| 2017/0311230 A1* | 10/2017 | Yang ................... H04W 48/16 |

OTHER PUBLICATIONS

Author Unknown, "Wideband transmission systems; Data transmission equipment operating in the 2,4 GHz band and using wide band modulation techniques; Harmonised Standard covering the essential requirments of article 3.2 of Directive 2014/53/EU," Harmonised European Standard, ETSI EN 300 328, Version 2.1.1, Nov. 2016, 101 pages.

International Search Report and Written Opinion for International Patent Application No. PCT/IB2017/057742, dated Mar. 21, 2018, 8 pages.

* cited by examiner

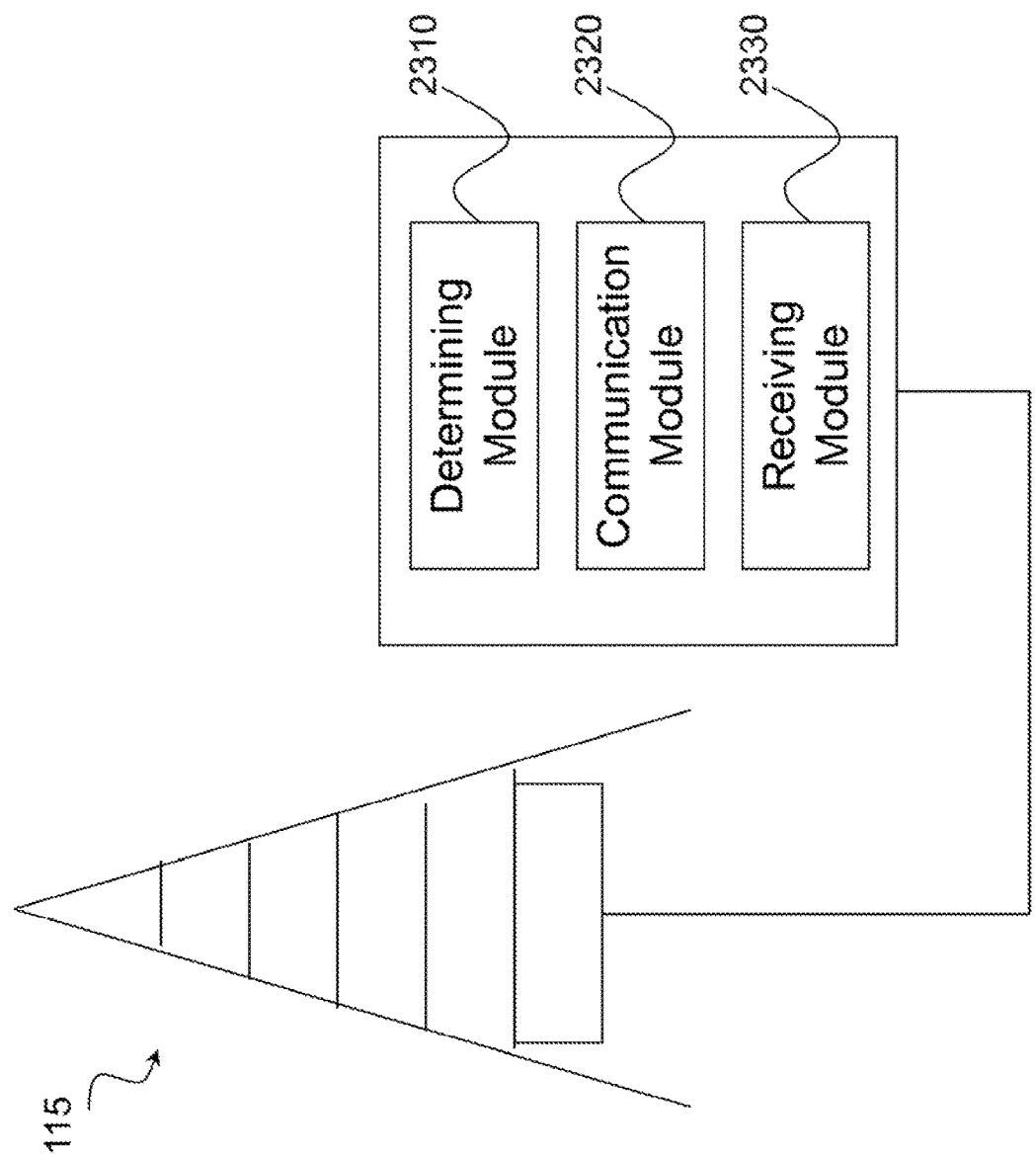

MEASUREMENTS FOR FREQUENCY HOPPING SYSTEMS

RELATED APPLICATIONS

This application is a national stage application of International Patent Application No. PCT/IB2017/057742, filed Dec. 7, 2017, which claims the benefit of U.S. provisional patent application Ser. No. 62/448,815, filed Jan. 20, 2017, the disclosures of which are hereby incorporated herein by reference in their entirety.

TECHNICAL FIELD

The present disclosure relates, in general, to telecommunications and, more particularly, to measurements for frequency hopping systems.

BACKGROUND

Internet of Things (IoT) can be considered a fast-evolving market within the telecommunications realm. Current $3^{rd}$ Generation Partnership Project (3GPP)-based standards offer three different variants supporting IoT services, including: enhanced Machine-Type Communication (eMTC); Narrow-Band IoT (NB-IoT); and Extended-Coverage Global System for Mobile Communications (EC-GSM). eMTC and NB-IoT have been designed using Long Term Evolution (LTE) as a baseline, with the main difference between the two being the minimum occupied bandwidth. eMTC and NB-IoT use 1.4 MHz and 180 kHz minimum bandwidth, respectively.

Both NB-IoT and eMTC have been designed with an operator deployment of macro cells in mind. Certain use cases where outdoor macro eNodeBs (eNBs) would communicate with IoT devices deep inside buildings are targeted, which require standardized coverage enhancement mechanisms.

3GPP LTE Release 12 defined a user equipment (UE) power saving mode allowing long battery lifetime, and a new UE category allowing reduced modem complexity. 3GPP Release 13 further introduced the eMTC feature, with a new category, Cat-M, that further reduces UE cost while supporting coverage enhancement. A key element to enable cost reduction for Cat-M UE is to introduce a reduced UE bandwidth of 1.4 MHz in downlink (DL) and uplink (UL) within any system bandwidth (as described in 3GPP Technical Report (TR) 36.888).

In LTE, the system bandwidth can be up to 20 MHz. This total bandwidth is divided into physical resource blocks (PRBs) of 180 kHz. Cat-M UEs with reduced UE bandwidth of 1.4 MHz only receive a part of the total system bandwidth at a time—a part corresponding to up to 6 PRBs. A group of 6 PRBs is referred to herein as a PRB group.

To achieve the coverage targeted in LTE Release 13 for low-complexity UEs and other UEs operating delay tolerant MTC applications (described in 3GPP TR 36.888), time repetition techniques are used to allow energy accumulation of the received signals at the UE side. For physical data channels (e.g., Physical Downlink Shared Channel (PDSCH) and Physical Uplink Shared Channel (PUSCH)), subframe bundling (also referred to as Transmission Time Interval (TTI) bundling) can be used. When subframe bundling is applied, each Hybrid Automatic Repeat Request (HARQ) transmission or retransmission comprises a bundle of multiple subframes instead of just a single subframe. Repetition over multiple subframes are also applied to physical control channels.

Energy accumulation of the received signals involves several aspects. One of the main aspects involves accumulating energy for reference signals, for example by applying time-filters, to increase the quality of channel estimates used in the demodulation process. A second main aspect involves accumulation of demodulated soft-bits across repeated transmissions.

Unlicensed bands offer the possibility for deployment of radio networks by non-traditional operators that do not have access to licensed spectrum, such as, for example, building owners, industrial sites and municipalities that want to offer a service within the operation they control. Recently, the LTE standard has been evolved to operate in unlicensed bands for the sake of providing mobile broadband using unlicensed spectrum. The 3GPP-based feature of Licensed Assisted Access (LAA) was introduced in Release 13, and supports carrier aggregation between a primary carrier in licensed bands, and one or several secondary carriers in unlicensed bands. Further evolution of the LAA feature, which only supported DL traffic, was specified within the Release 14 feature of enhanced Licensed Assisted Access (eLAA), which added the possibility to also schedule UL traffic on the secondary carriers. In parallel to the work within 3GPP Release 14, work within the MulteFire Alliance (MFA) aimed to standardize a system that would allow the use of standalone primary carriers within unlicensed spectrum. The resulting MulteFire 1.0 standard supports both UL and DL traffic.

Discussions are currently ongoing within both 3GPP and MFA regarding the potential to evolve existing unlicensed standards to also support IoT use-cases within unlicensed bands. Discussions within the MFA explicitly mention the opportunity for developing new standards that would have either of NB-IoT or eMTC as baseline. A key issue to consider for such a design are the regulatory requirements, which differ depending on frequency band and region.

One specific frequency band that may be eligible for IoT operation would be the band in the vicinity of 2.4 GHz. Requirements for the European region are specified within the European Telecommunications Standards Institute (ETSI) harmonized standard for equipment using wide band modulation, ETSI EN 300 328. Some key requirements from ETSI EN 300 328 are described below.

With respect to 2.4 GHz requirements for the European region and coverage extension, ETSI EN 300 328 provisions several adaptivity requirements for different operation modes. From the top level, equipment can be classified either as frequency hopping or non-frequency hopping, as well as adaptive or non-adaptive. To better coexist with other users of the channel, adaptive equipment is required to sense whether the channel is occupied. The improved coexistence may come from, for example, listen-before-talk (LBT) or detect and avoid (DAA) mechanisms. Non-frequency hopping equipment are subject to requirements on maximum power spectral density (PSD) of 10 dBm/MHz, which limits the maximum output power for systems using narrower bandwidths. Common for any of the adaptive schemes is the consequence that the receiving node will be unaware of the result of the sensing, and thus needs to detect whether signal is present or not. While such a signal detection most likely would be feasible for devices operating in moderate to high signal-to-interference-plus-noise ratio (SINR) levels, it may be infeasible for very low SINR levels.

For systems using repetition schemes to achieve coverage extension, the received SINR of each individual transmission is very low. Through accumulation of multiple transmissions, the effective SINR increases. However, in case the accumulation would include both signal as well as noise (as could be the case when the transmitter uses adaptive mechanisms), the repetition techniques may fail. One way of avoiding this would be to attempt detection of each individual repetition, although as described above this may not be feasible at the very low SINR levels targeted with these IoT standards. An IoT standard for 2.4 GHz in Europe may therefore be best devised by categorizing its devices as non-adaptive frequency hopping.

FIG. 1 illustrates the dwell time of the 2.4 GHz regulation in Europe. Requirements for non-adaptive frequency hopping include the following key parts. First, there is a maximum on-time of 5 ms, which is required to be followed by a transmission gap. This is illustrated in the example of FIG. 1 by a plurality of on-times at a first frequency (Frequency 1) 5A, 5B, and 5C, each of which is followed by a transmission gap 10A, 10B, and 10C, respectively. Second, there is a minimum duration of the transmission gap of 5 ms (as shown in FIG. 1, in which each of the transmission gaps 10A-F has a duration of 5 ms). Third, there is a maximum accumulated transmit time of 15 ms, which is the maximum total transmission time a node may be allowed to use before moving to the next frequency hop. As shown in the example of FIG. 1, after on-times 5A, 5B, and 5C (which amount to a total of 15 ms of transit time on Frequency 1), the node moves to Frequency 2 for the next set of on-times 5D, 5E, and 5F.

In any wireless systems with mobility, the UE is required to measure neighbor cells. In LTE, the frequency to cell mapping is constant. In LTE unlicensed operation, the frequency to cell mapping can change due to experienced interference. The eNB controlling the cell can change frequency to avoid or abandon a frequency with high interference. The cost of moving frequencies is high, so this is expected to happen at intervals of, at the least, tens of seconds (and may be typically in minutes and hours). In both cases, from the UE perspective there is a notion of the serving frequency where the UE is receiving service and neighbor cells operating on the same frequency or different frequencies.

FIG. 2 illustrates an example of a frequency hopping pattern. More particularly, FIG. 2 illustrates time-frequency grid 200 for frequency hopping period 205. Frequency hopping period 205 is divided into a plurality of time intervals 210. In the example of FIG. 2, each time interval is associated with one of N frequencies 215. In the frequency hopping system, there is no notion of intra- or inter-frequencies. The frequency pattern of the serving cell 220 uses all of the frequencies over the course of frequency hopping period 205 (switching from one frequency 215 to the next frequency 215 at the end of each time interval 210). The neighbor cells will also use the same frequencies, but typically not in the same order. It is the most advantageous for all eNBs to use all frequencies to spread the energy and reduce potential interference.

A competitive advantage for an LTE frequency hopping spread spectrum (FHSS) system is to support a key strength of LTE, which is UE mobility. Because the neighbor cell frequencies are fixed and known in LTE (or relatively slowly changing in LTE-U), UE measurements are feasible.

FIG. 3 illustrates an example of measurement occasions in a FHSS system. Similar to FIG. 2 discussed above, FIG. 3 illustrates time-frequency grid 300 for frequency hopping period 305. Frequency hopping period 305 is divided into a plurality of time intervals 310, and at each time interval 310 frequency hopping pattern of the serving cell 315 is associated with one of a plurality of frequencies. In addition to frequency hopping pattern of the serving cell 315, FIG. 3 illustrates frequency hopping pattern of a first neighbor cell 320 and frequency hopping pattern of a second neighbor cell 325. As can be seen from the example of FIG. 3, frequency hopping patterns 315, 320, and 325 (for the serving cell, first neighbor cell, and second neighbor cell, respectively) are different.

The UE uses reference signals transmitted by the serving cell and the neighboring cells to measure the cell quality of the serving and neighboring cells, for example using measurements performed during measurement occasions 330. As can be seen from the example of FIG. 3, the reference signals with which the UE measures the cell quality are frequency hopping for neighboring cells (i.e., the reference signals are transmitted at different frequencies in each time interval 310). The timing and frequency location of the reference signals for the neighboring cells, however, is in many cases not known to the UE. As a result, it is difficult for the UE to find and measure these signals. In addition, background cell search (which may be used to find unknown cells in the area), is also restricted because the UE would need to stay at one frequency for the duration of frequency hopping period 305 to be sure to encounter a reference signal from a neighboring cell. Thus, there is a need for an improved approach to enabling UEs to measure reference signals in frequency hopping schemes.

SUMMARY

To address the foregoing problems with existing approaches, disclosed is a method in a wireless device. The method comprises identifying a configuration of a coordinated measurement occasion. The method comprises, during the coordinated measurement occasion, performing one or more measurements with respect to a plurality of reference signals transmitted from different cells, in accordance with the identified configuration, wherein: each of the different cells is associated with at least one of the plurality of reference signals; and the configuration defines a common time interval and one or more common frequencies for the different cells to transmit their respective associated reference signal during the coordinated measurement occasion.

In certain embodiments, the plurality of reference signals may comprise discovery reference signals.

In certain embodiments, the method may comprise identifying the coordinated measurement occasion, wherein the one or more measurements are performed in response to identifying the coordinated measurement occasion.

In certain embodiments, the wireless device may communicate according to a predetermined frequency hopping pattern during times outside of the coordinated measurement occasion, and may deviate from the predetermined frequency hopping pattern to the one or more common frequencies during the coordinated measurement occasion.

In certain embodiments, each of the different cells may communicate according to a different predetermined frequency hopping pattern during times outside of the coordinated measurement occasion, and at least one of the different cells may deviate from its predetermined frequency hopping pattern to one of the one or more common frequencies during the coordinated measurement occasion.

In certain embodiments, the configuration may further define a frequency hopping pattern for changing the common frequency between different coordinated measurement occasions.

In certain embodiments, the method may comprise distinguishing between the reference signals transmitted from the different cells based on physical cell identifiers transmitted in conjunction with the reference signals.

In certain embodiments, the one or more different cells may perform listen-before-talk within the coordinated measurement occasion to avoid collisions between the reference signals.

In certain embodiments, the different cells may transmit the reference signals according to distinct or random timing offsets within the coordinated measurement occasion to avoid collisions between the reference signals.

In certain embodiments, each of the different cells may select a frequency to use to transmit its associated reference signal during the coordinated measurement occasion from the one or more common frequencies defined in the configuration. Each of the different cells may select the frequency to use to transmit its associated reference signal during the coordinated measurements occasion independently such that the plurality of reference signals are transmitted on different frequencies.

In certain embodiments, the common frequency may be a native frequency of at least one of the different cells. The native frequency may be a frequency within a frequency hopping pattern of the at least one of the different cells.

In certain embodiments, identifying the configuration of the coordinated measurement occasion may comprise one of: determining the configuration of the coordinated measurement occasion; accessing the configuration of the coordinated measurement occasion from a memory of the wireless device; and receiving an indication of the configuration of the coordinated measurement occasion. In certain embodiments, the wireless device may be preconfigured with the configuration of the coordinated measurement occasion.

Also disclosed is a wireless device. The wireless device comprises processing circuitry. The processing circuitry is configured to identify a configuration of a coordinated measurement occasion. The processing circuitry is configured to, during the coordinated measurement occasion, perform one or more measurements with respect to a plurality of reference signals transmitted from different cells, in accordance with the identified configuration, wherein: each of the different cells is associated with at least one of the plurality of reference signals; and the configuration defines a common time interval and one or more common frequencies for the different cells to transmit their respective associated reference signal during the coordinated measurement occasion.

Also disclosed is a method in a network node. The method comprises determining a configuration for at least one coordinated measurement occasion, the configuration defining a common time interval and one or more common frequencies for transmission of a plurality of reference signals by different cells during the coordinated measurement occasion, wherein each of the different cells transmits at least one of the plurality of reference signals. The method comprises communicating the configuration to the different cells.

In certain embodiments, the plurality of reference signals may comprise discovery reference signals.

In certain embodiments, each of the different cells may communicate according to a different predetermined frequency hopping pattern during times outside of the coordinated measurement occasion, and at least one of the different cells may deviate from its predetermined frequency hopping pattern to one of the one or more common frequencies during the coordinated measurement occasion.

In certain embodiments, the configuration may further define a frequency hopping pattern for changing the common frequency between different coordinated measurement occasions.

In certain embodiments, the one or more different cells may perform listen-before-talk within the coordinated measurement occasion to avoid collisions between the reference signals.

In certain embodiments, the different cells may transmit the reference signals according to distinct or random timing offsets within the coordinated measurement occasion to avoid collisions between the reference signals.

In certain embodiments, each of the different cells may select a frequency to use to transmit its associated reference signal during the coordinated measurement occasion from the one or more common frequencies defined in the configuration.

In certain embodiments, each of the different cells may select the frequency to use to transmit its associated reference signal during the coordinated measurements occasion independently such that the plurality of reference signals are transmitted on different frequencies.

In certain embodiments, the common frequency may be a native frequency of at least one of the different cells. The native frequency may be a frequency within a frequency hopping pattern of the at least one of the different cells.

Also disclosed is a network node. The network node comprises processing circuitry. The processing circuitry is configured to determine a configuration for at least one coordinated measurement occasion, the configuration defining a common time interval and one or more common frequencies for transmission of a plurality of reference signals by different cells during the coordinated measurement occasion, wherein each of the different cells transmits at least one of the plurality of reference signals. The processing circuitry is configured to communicate the configuration to the different cells.

Also disclosed is a method in a network node. The method comprises obtaining a configuration for at least one coordinated measurement occasion, the configuration defining a common time interval and one or more common frequencies for transmission of a plurality of reference signals by different cells during the coordinated measurement occasion, wherein the different cells comprise at least one cell associated with the network node. The method comprises transmitting a reference signal during the at least one coordinated measurement occasion according to the obtained configuration.

In certain embodiments, obtaining the configuration for the at least one coordinated measurement occasion may comprise one of: determining the configuration for the at least one coordinated measurement occasion; and receiving the configuration for the at least one coordinated measurement occasion from another network node.

In certain embodiments, the method may comprise providing an indication of the configuration for the at least one coordinated measurement occasion to one or more wireless devices.

In certain embodiments, the transmission of the reference signal according to the obtained configuration may be a deviation from a predetermined frequency hopping pattern of the at least one cell associated with the network node.

In certain embodiments, the plurality of reference signals may comprise discovery reference signals.

In certain embodiments, the method may comprise identifying the coordinated measurement occasion, and the reference signal may be transmitted in response to identifying the coordinated measurement occasion In certain embodiments, the one or more different cells may communicate according to a predetermined frequency hopping pattern during times outside of the coordinated measurement occasion, and may deviate from the predetermined frequency hopping pattern to the one or more common frequencies during the coordinated measurement occasion.

In certain embodiments, each of the different cells may communicate according to a different predetermined frequency hopping pattern during times outside of the coordinated measurement occasion, and at least one of the different cells may deviate from its predetermined frequency hopping pattern to the one or more common frequencies during the coordinated measurement occasion.

In certain embodiments, the configuration may further define a frequency hopping pattern for changing the common frequency between different coordinated measurement occasions.

In certain embodiments, the method may comprise transmitting a physical cell identifier in conjunction with the reference signal transmitted according to the obtained configuration to enable the one or more wireless devices to distinguish between the plurality of reference signals transmitted by the different cells.

In certain embodiments, the method may comprise performing listen-before-talk within the coordinated measurement occasion to avoid collisions between the plurality of reference signals transmitted by the different cells.

In certain embodiments, transmitting the reference signal during the at least one coordinated measurement occasion may comprise transmitting the reference signals according to a distinct or random timing offset within the coordinated measurement occasion to avoid collisions between the plurality reference signals transmitted by the different cells.

In certain embodiments, the method may comprise selecting a frequency to use to transmit the reference signal during the at least one coordinated measurement occasion from the one or more common frequencies defined in the configuration. The selected common frequency may be selected independently and may be different from the frequencies used by other cells of the different cells.

In certain embodiments, the common frequency may be a native frequency of the at least one cell associated with the network node. The native frequency may be a frequency within a frequency hopping pattern of the at least one cell associated with the network node.

Also disclosed is a network node. The network node comprises a transmitter and processing circuitry coupled to the transmitter. The processing circuitry is configured to obtain a configuration for at least one coordinated measurement occasion, the configuration defining a common time interval and one or more common frequencies for transmission of a plurality of reference signals by different cells during the coordinated measurement occasion, wherein the different cells comprise at least one cell associated with the network node. The processing circuitry is configured to transmit, via the transmitter, a reference signal during the at least one coordinated measurement occasion according to the obtained configuration.

Certain embodiments of the present disclosure may provide one or more technical advantages. For example, certain embodiments may advantageously allow LTE-like measurement configurations that are frequency-based. As another example, certain embodiments may advantageously enable wireless devices to avoid wasting time performing cell search on time and frequency regions that do not contain reference signals from neighboring cells. As still another example, certain embodiments may enable more efficient use of measurement reference signals from the network nodes. As yet another example, certain embodiments may enable wireless devices to more efficiently measure the cell quality using these signals. Other advantages may be readily apparent to one having skill in the art. Certain embodiments may have none, some, or all of the recited advantages.

BRIEF DESCRIPTION OF THE DRAWINGS

For a more complete understanding of the disclosed embodiments and their features and advantages, reference is now made to the following description, taken in conjunction with the accompanying drawings, in which like reference labels denote like features:

FIG. 23 is a block schematic of an exemplary network node, in accordance with certain embodiments.

DETAILED DESCRIPTION

Figure 1:
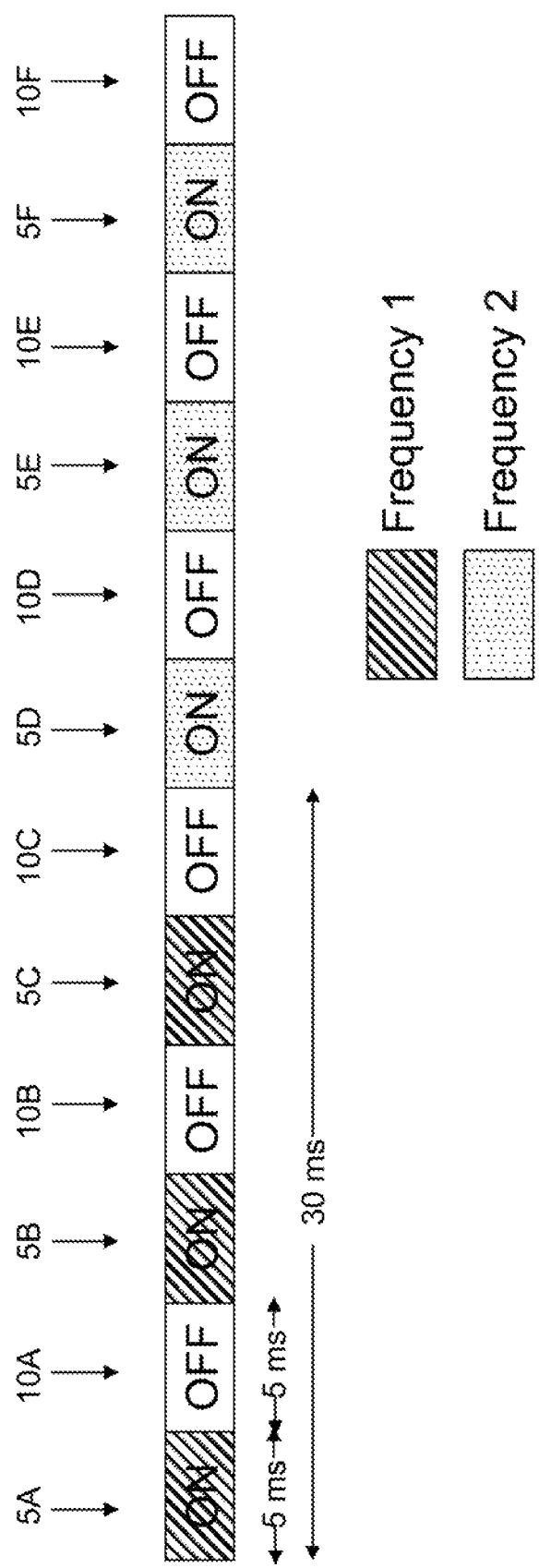
FIG. 1 illustrates the dwell time of the 2.4 GHz regulation in Europe.
Figure 2:
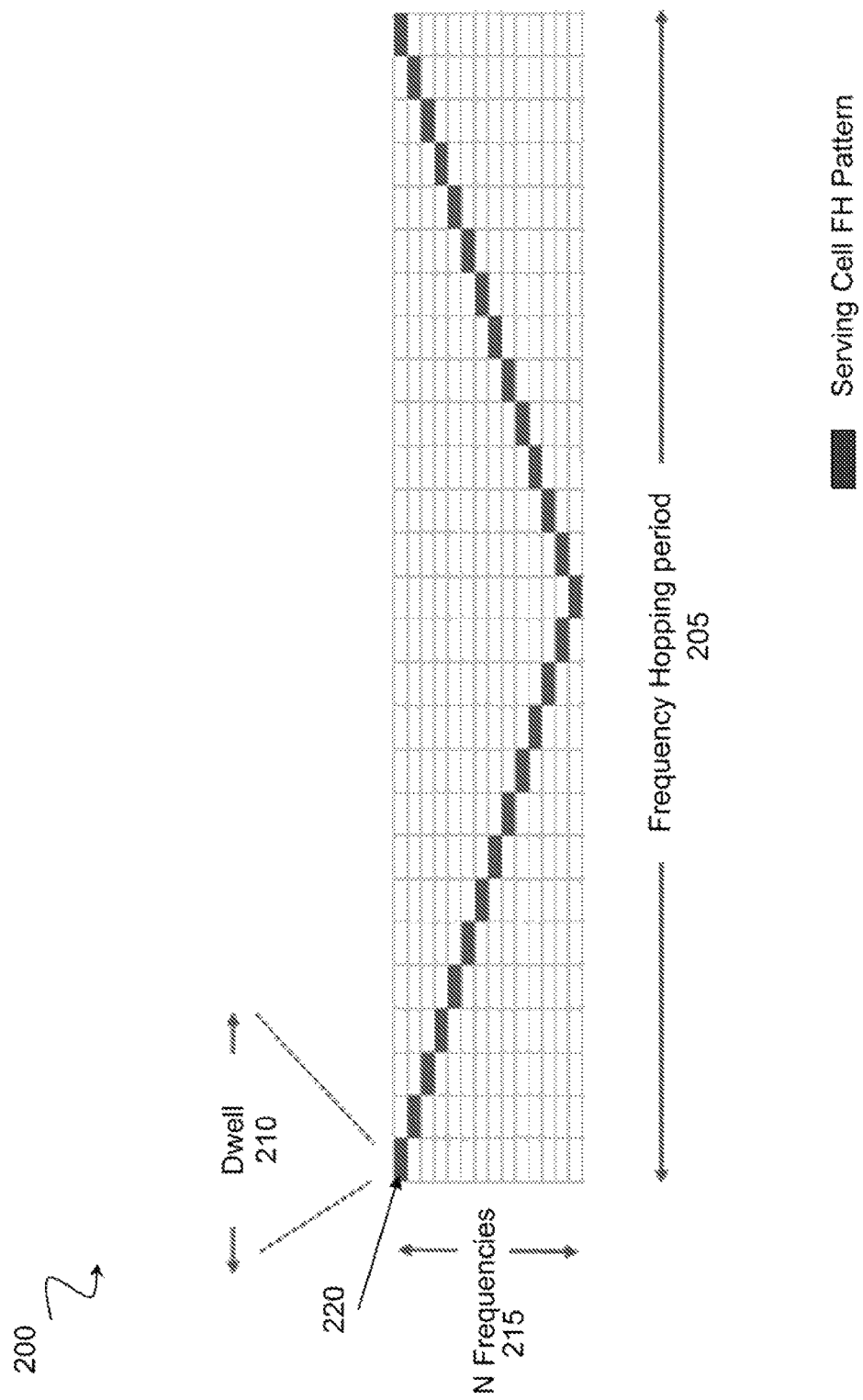
FIG. 2 illustrates an example of a frequency hopping pattern.

As described above, wireless devices (e.g., UEs) use reference signals transmitted by the serving cell and neighboring cells to measure the cell quality of the serving and neighboring cells. Existing approaches to performing these measurements in systems where the reference signals are frequency hopping for neighboring cells suffer from certain deficiencies. For example, the timing and frequency location of the reference signals may not be known for the reference signals, so in some cases it can be difficult for the wireless device to find and measure these signals. Additionally, background cell search (e.g., to find unknown cells in the area) is also restricted because the wireless device would need to stay at one frequency for at least one frequency hopping period to be sure to encounter a reference signal from a neighboring cell.

The present disclosure contemplates various embodiments that may address these and other deficiencies associated with existing approaches. In some cases, this is achieved through methods in network nodes (e.g., eNBs) to limit the possible frequencies and timings of the reference signal that may advantageously facilitate measuring of reference signals by the wireless device. For example, in certain embodiments network nodes in a frequency hopping system may be enabled to synchronize reference signals (e.g., discovery reference signals (DRSs)), sometimes in a loose manner, through the use of a limited set of frequencies as measurement frequencies regardless of the native frequency hopping pattern of the cells. In some cases, the network nodes may be part of an area assessed as needing coordination of measurement occasions. A configuration for one or more coordinated measurement occasions may be determined and shared among all of the cells in the area. As described in more detail below, the configuration may define the time and frequencies used (and in some cases, a hopping pattern used) during the coordinated measurement occasions. A wireless device communicating with the network nodes may be informed of the determined configuration (e.g., by broadcast information or dedicated signaling), and perform, according to the determined configuration, measurements on reference signals (e.g., DRSs) transmitted on the limited set of frequencies during the coordinated measurement occasions (in some cases using measurement gaps). In some cases, data transmissions and their control signaling may be suspended during the measurement occasion, and the wireless device may perform measurements on known cell(s) and/or background cell search for unknown cells.

According to one example embodiment, a method in a network node is disclosed. The network node determines a configuration for at least one coordinated measurement occasion. The configuration defines a common time interval and one or more common frequencies for transmission of a plurality of reference signals by different cells during the coordinated measurement occasion. Each of the different cells transmits at least one of the plurality of reference signals. The network node communicates the configuration to the different cells.

In certain embodiments, the plurality of reference signals may comprise DRSs. In certain embodiments, each of the different cells may communicate according to a different predetermined frequency hopping pattern during times outside of the coordinated measurement occasion, and at least one of the different cells may deviate from its predetermined frequency hopping pattern to one of the one or more common frequencies during the coordinated measurement occasion.

According to another example embodiment, a method in a network node is disclosed. The network node obtains a configuration for at least one coordinated measurement occasion. The configuration defines a common time interval and one or more common frequencies for transmission of a plurality of reference signals by different cells during the coordinated measurement occasion. The different cells comprise at least one cell associated with the network node. The network node transmits a reference signal during the at least one coordinated measurement occasion according to the obtained configuration.

According to another example embodiment, a method in a wireless device (e.g., a UE) is disclosed. The wireless device identifies a configuration of a coordinated measurement occasion. During the coordinated measurement occasion, the wireless device performs one or more measurements with respect to a plurality of reference signals transmitted from different cells, in accordance with the identified configuration. Each of the different cells is associated with at least one of the plurality of reference signals. The configuration defines a common time interval and one or more common frequencies for the different cells to transmit their respective associated reference signal during the coordinated measurement occasion.

Certain embodiments of the present disclosure may provide one or more technical advantages. For example, certain embodiments may advantageously allow LTE-like measurement configurations that are frequency-based. As another example, certain embodiments may advantageously enable wireless devices to avoid wasting time performing cell search on time and frequency regions that do not contain reference signals from neighboring cells. As still another example, certain embodiments may enable more efficient use of measurement reference signals from the network nodes. As yet another example, certain embodiments may enable wireless devices to more efficiently measure the cell quality using these signals. Other advantages may be readily apparent to one having skill in the art. Certain embodiments may have none, some, or all of the recited advantages.

Figure 4:
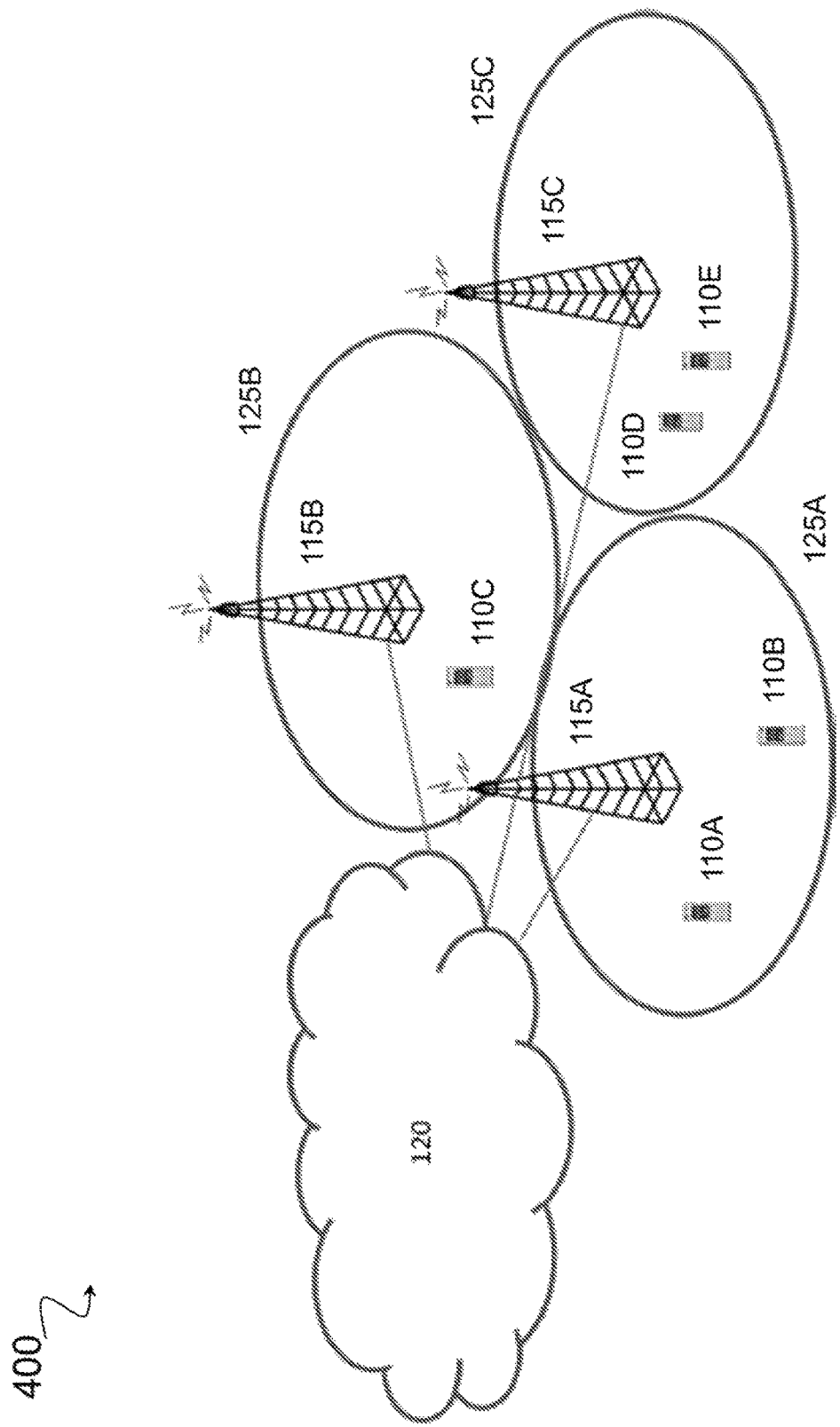
FIG. 4 is a block diagram illustrating an embodiment of a network, in accordance with certain embodiments.

FIG. 4 is a block diagram illustrating an embodiment of a network 400, in accordance with certain embodiments. Network 400 includes one or more wireless devices 110 (e.g., a UE) and one or more network node(s) 115 (e.g., an eNB or a gNB). Wireless devices 110 may communicate with network nodes 115 over a wireless interface. For example, a wireless device 110 may transmit wireless signals to one or more of network nodes 115, and/or receive wireless signals from one or more of network nodes 115. The wireless signals may contain voice traffic, data traffic, control signals, and/or any other suitable information. In some embodiments, an area of wireless signal coverage associated with a network node 115 may be referred to as a cell 125. Wireless devices 110 may be capable of performing LAA and/or carrier aggregation operations, and may be capable of operating in both the licensed and unlicensed spectrum. In some embodiments, wireless devices 110 may have device-to-device (D2D) capability. Thus, wireless devices 110 may be able to receive signals from and/or transmit signals directly to another wireless device.

In certain embodiments, network nodes 115 may interface with a radio network controller. The radio network controller may control network nodes 115 and may provide certain radio resource management functions, mobility management functions, and/or other suitable functions. In certain embodiments, the functions of the radio network controller may be included in network node 115. The radio network controller may interface with a core network node. In certain embodiments, the radio network controller may interface with the core network node via an interconnecting network 120. Interconnecting network 120 may refer to any interconnecting system capable of transmitting audio, video, signals, data, messages, or any combination of the preceding. Interconnecting network 120 may include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof.

In some embodiments, the core network node may manage the establishment of communication sessions and various other functionalities for wireless devices 110. Wireless devices 110 may exchange certain signals with the core network node using the non-access stratum layer. In non-access stratum signaling, signals between wireless devices 110 and the core network node may be transparently passed through the radio access network. In certain embodiments, network nodes 115 may interface with one or more network nodes over an internode interface, such as, for example, an X2 interface.

As described above, example embodiments of network 400 may include one or more wireless devices 110, and one or more different types of network nodes capable of communicating (directly or indirectly) with wireless devices 110.

In some embodiments, the non-limiting term wireless device is used. Wireless devices 110 described herein can be any type of wireless device capable, configured, arranged and/or operable to communicate wirelessly with network nodes 115 and/or another wireless device. Communicating wirelessly may involve transmitting and/or receiving wireless signals using electromagnetic signals, radio waves, infrared signals, and/or other types of signals suitable for conveying information through air. In particular embodiments, wireless devices 110 may be configured to transmit and/or receive information without direct human interaction. For instance, a wireless device 110 may be designed to transmit information to a network on a predetermined schedule, when triggered by an internal or external event, or in response to requests from the network. Generally, a wireless device 110 may represent any device capable of, configured for, arranged for, and/or operable for wireless communication, for example radio communication devices. Examples of wireless devices 110 include, but are not limited to, UEs such as smart phones. Further examples include wireless cameras, wireless-enabled tablet computers, mobile terminals, laptop-embedded equipment (LEE), laptop-mounted equipment (LME), USB dongles, and/or wireless customer-premises equipment (CPE). Wireless device 110 may also be a radio communication device, target device, D2D UE, machine-type-communication (MTC) UE or UE capable of machine-to-machine (M2M) communication, low-cost and/or low-complexity UE, a sensor equipped with UE, or any other suitable devices. Wireless devices 110 may operate under either normal coverage or enhanced coverage with respect to its serving cell. The enhanced coverage may be interchangeably referred to as extended coverage. UE 110 may also operate in a plurality of coverage levels (e.g., normal coverage, enhanced coverage level 1, enhanced coverage level 2, enhanced coverage level 3 and so on). In some cases, UE 110 may also operate in out-of-coverage scenarios.

As one specific example, wireless device 110 may represent a UE configured for communication in accordance with one or more communication standards promulgated by 3GPP, such as 3GPP's GSM, UMTS, LTE, and/or 5G standards. As used herein, a "UE" may not necessarily have a "user" in the sense of a human user who owns and/or operates the relevant device. Instead, a UE may represent a device that is intended for sale to, or operation by, a human user but that may not initially be associated with a specific human user.

Wireless devices 110 may support D2D communication, for example by implementing a 3GPP standard for sidelink communication, and may in this case be referred to as a D2D communication device.

As yet another specific example, in an Internet of Things (TOT) scenario, a wireless device 110 may represent a machine or other device that performs monitoring and/or measurements, and transmits the results of such monitoring and/or measurements to another wireless device and/or a network node. The wireless device may in this case be a M2M device, which may in a 3GPP context be referred to as a MTC device. As one particular example, a wireless device 110 may be a UE implementing the 3GPP narrow band internet of things (NB-IoT) standard. Particular examples of such machines or devices are sensors, metering devices such as power meters, industrial machinery, or home or personal appliances (e.g., refrigerators, televisions, personal wearables such as watches, etc.). In other scenarios, a wireless device 110 may represent a vehicle or other equipment that is capable of monitoring and/or reporting on its operational status or other functions associated with its operation.

Wireless device 110 as described above may represent the endpoint of a wireless connection, in which case the device may be referred to as a wireless terminal. Furthermore, a wireless device 110 as described above may be mobile, in which case it may also be referred to as a mobile device or a mobile terminal.

Also, in some embodiments generic terminology, "network node" is used. As used herein, "network node" refers to equipment capable, configured, arranged and/or operable to communicate directly or indirectly with a wireless device and/or with other equipment in the wireless communication network that enable and/or provide wireless access to the wireless device. Examples of network nodes include, but are not limited to, access points (APs), in particular radio APs. A network node may represent base stations (BSs), such as radio base stations. Particular examples of radio base stations include Node Bs, evolved Node Bs (eNBs), and gNBs. Base stations may be categorized based on the amount of coverage they provide (or, stated differently, their transmit power level) and may then also be referred to as femto base stations, pico base stations, micro base stations, or macro base stations. "Network node" also includes one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base stations may also be referred to as nodes in a distributed antenna system (DAS).

As a particular non-limiting example, a base station may be a relay node or a relay donor node controlling a relay.

Yet further examples of network nodes include multi-standard radio (MSR) radio equipment such as MSR BSs, network controllers such as radio network controllers (RNCs) or base station controllers (BSCs), base transceiver stations (BTSs), transmission points, transmission nodes, Multi-cell/multicast Coordination Entities (MCEs), core network nodes (e.g., MSCs, MMEs, etc.), Operation and Maintenance (O&M) nodes, Operations Support System (OSS) nodes, Self-Organizing Network (SON) nodes, positioning nodes (e.g., Evolved Serving Mobile Location Center (E-SMLCs)), minimization of drive tests (MDTs), or any other suitable network node. More generally, however, network nodes may represent any suitable device (or group of devices) capable, configured, arranged, and/or operable to enable and/or provide a wireless device access to the wireless communication network or to provide some service to a wireless device that has accessed the wireless communication network.

The terminology such as network node and wireless device should be considered non-limiting and does in particular not imply a certain hierarchical relation between the two; in general "network node" could be considered as device 1 and "wireless device" device 2, and these two devices communicate with each other over some radio channel.

Example embodiments of wireless device 110, network nodes 115, and other network nodes (such as radio network controller or core network node) are described in more detail below with respect to FIGS. 14-23.

Although FIG. 4 illustrates a particular arrangement of network 400, the present disclosure contemplates that the various embodiments described herein may be applied to a variety of networks having any suitable configuration. For example, network 400 may include any suitable number of wireless devices 110 and network nodes 115, as well as any additional elements suitable to support communication between wireless devices or between a wireless device and another communication device (such as a landline telephone). Furthermore, although certain embodiments may be described as implemented in an LTE/MulteFire network, the embodiments may be implemented in any appropriate type of telecommunication system supporting any suitable communication standards (including 5G standards) and using any suitable components, and are applicable to any radio access technology (RAT) or multi-RAT systems in which a wireless device receives and/or transmits signals (e.g., data). For example, the various embodiments described herein may be applicable to LTE, LTE-Advanced, LTE in Unlicensed Spectrum (LTE-U), MulteFire, NR, 5G, IoT, NB-IoT, UMTS, HSPA, GSM, cdma2000, WCDMA, WiMax, UMB, WiFi, another suitable radio access technology, or any suitable combination of one or more radio access technologies. Although the systems and methods for performing measurements for frequency hopping systems and related embodiments may be described herein using the LAA/MulteFire UL as examples, the present disclosure is not limited to these examples. Rather, the present disclosure contemplates that the various embodiments described herein may be applied to other systems as well as DL or sidelinks. Additionally, although reference may be made to the term "cell", the described concepts may also apply in other contexts, such as beams used in Fifth Generation (5G) systems, for instance.

As described above, the present disclosure contemplates various embodiments that may address deficiencies associated with existing approaches to performing measurements on reference signals in systems where the reference signals are frequency hopping for neighboring cells. In some cases, this is achieved through methods in network nodes 115 to limit the possible frequencies and timings of the reference signal that may advantageously facilitate measuring of reference signals by wireless device 110.

As described above, FIG. 4 illustrates network 400 comprising a plurality of different network nodes 115, including network nodes 115A, 115B, and 115C. Each network node has an associated coverage area (or cell) 125 associated with it. More specifically, network node 115A is associated with cell 125A, network node 115B is associated with cell 125B, and network node 115C is associated with cell 125C.

In certain embodiments, a network node 115 (e.g., network node 115A) determines a configuration for at least one coordinated measurement occasion. The configuration may define a common time interval and one or more common frequencies for transmission of a plurality of reference signals (e.g., DRSs) by different cells (e.g., cells 125A, 125B, and 125C associated with network nodes 115A, 115B, and 115C, respectively) during the coordinated measurement occasion. Each of the different cells 125 may transmit at least one of the plurality of reference signals.

Note that although the various embodiments disclosed herein may be described using DRSs as examples of reference signals, this is for purposes of example only. The present disclosure contemplates that any suitable reference signals may be used (e.g., Channel State Information Reference Signals (CSI-RS), Primary Synchronization Signal (PSS), Secondary Synchronization Signal (SSS), Synchronization Signal Block (SSB), Mobility Reference Signal (MRS), and/or Tracking Reference Signal (TRS)). Similarly, although certain examples may describe network node 115A as determining the configuration of the coordinated measurement occasion, the present disclosure is not limited to this example. Any suitable network node 115 may determine the configuration for the coordinated measurement occasion, and in certain embodiments a plurality of network nodes 115 may collaborate to determine the configuration of the coordinated measurement occasion (e.g., by sharing their frequency hopping patterns and negotiating the configuration of the coordinated measurement occasion).

As used herein, the term "coordinated measurement occasion" denotes a measurement occasion that has been coordinated for use by multiple wireless devices 110 and/or cells 125. For instance, a coordinated measurement occasion may be determined by the network (e.g., by network node 115A as described above, by another network node 115, another network entity such as a core network node, or a combination of the above) such that DRSs are transmitted in the different cells 125A, 125B, 125C by their respective network nodes 115 during the coordinated measurement occasion. Put another way, the coordinated measurement occasion may be determined such that one or more frequency hopping wireless devices 110 perform measurements on the DRS during the coordinated measurement occasion.

The configuration for the at least one coordinated measurement occasion may include any suitable information. As described above, the configuration of the coordinated measurement occasion typically comprises a time or interval of the occasion, as well as a frequency or frequencies at which the DRSs are to be transmitted and measurements are to be performed on the DRS. In certain embodiments, the configuration may further comprise a frequency hopping pattern for changing the common frequency between different coordinated measurement occasions (i.e., a frequency hopping pattern that defines hopping of the common frequency or frequencies between coordinated measurement occasions). The configuration may be communicated to multiple cells and/or network nodes to enable them to transmit the DRSs in coordinated fashion. For example, network node 115A may communicate the configuration to the different cells (e.g., to network nodes 115B and 115C associated with cells 125B and 125C, respectively).

In certain embodiments, network nodes 115A, 115B, 115C obtain the configuration for the least one coordinated measurement occasion, which, as described above, defines the common time interval and one or more common frequencies for transmission of a plurality of reference signals in the different cells (e.g., cells 125A, 125B, and 125C associated with network nodes 115A, 115B, and 115C, respectively) during the coordinated measurement occasion. Network nodes 115 may obtain the configuration for the at least one coordinated measurement occasion in any suitable manner. As one example, network node 115A may obtain the configuration for the at least one coordinated measurement occasion by determining the configuration for the at least one coordinated measurement occasion (e.g., as described above). As another example, network nodes 115B and 115C may obtain the configuration for the at least one coordinated measurement occasion by receiving the configuration for the at least one coordinated measurement occasion from another network node (e.g., network node 115A). In certain embodiments, one or more of network nodes 115A, 115B, and 115C may provide an indication of the configuration for the at least one coordinated measurement occasion (e.g., a values such as an index that is indicative of the configuration or the configuration itself) to one or more wireless devices 110.

The configuration of the coordinated measurement occasion (or an indication thereof) may be communicated to wireless devices 110 in any suitable manner. As one example, the configuration of the coordinated measurement occasion may be communicated to wireless devices 110 by system information broadcast. As another example, the configuration of the coordinated measurement occasion may be signaled through dedicated signaling to the connected mode wireless devices 110 that have high mobility.

Wireless devices 110 identify a configuration of the coordinated measurement occasion. Wireless devices 110 may identify the configuration of the coordinated measurement occasion in any suitable manner. For example, wireless devices 110 may identify the configuration of the coordinated measurement occasion by receiving an indication of the configuration of the coordinated measurement occasion, for example from a network node 115. As described above, wireless devices 110 may receive a value such as an index value that is indicative of the configuration. Wireless device 110 may identify the configuration of the coordinated measurement occasion by determining the configuration of the coordinated measurement occasion, for example based on the obtained value. In certain embodiments, wireless devices 110 may identify the configuration of the coordinated measurement occasion by accessing the configuration of the coordinated measurement occasion from a memory of the wireless device. As another example, in certain embodiments, wireless devices 110 may be preconfigured with the configuration of the coordinated measurement occasion (e.g., at the time of manufacture).

In certain embodiments, after obtaining the configuration for the at least one coordinated measurement occasion, but prior to transmitting any reference signal, network nodes 115A, 115B, and 115C may identify the coordinated measurement occasion. Similarly, wireless devices 110 may identify the coordinated measurement occasion.

Network nodes 115A, 115B, and 115C transmit a reference signal (e.g., a DRS) during the at least one coordinated measurement occasion according to the obtained configuration. In certain embodiments, the reference signal may be transmitted in response to identifying the coordinated measurement occasion. Wireless devices 110, during the coordinated measurement occasion, perform one or more measurements with respect to the reference signals transmitted from in the different cells 125A, 125B, and 125C by network nodes 115A, 115B, and 115C, respectively. In certain embodiments, wireless devices 110 may perform the one or more measurements in response to identifying the coordinated measurement occasion.

Figure 5:
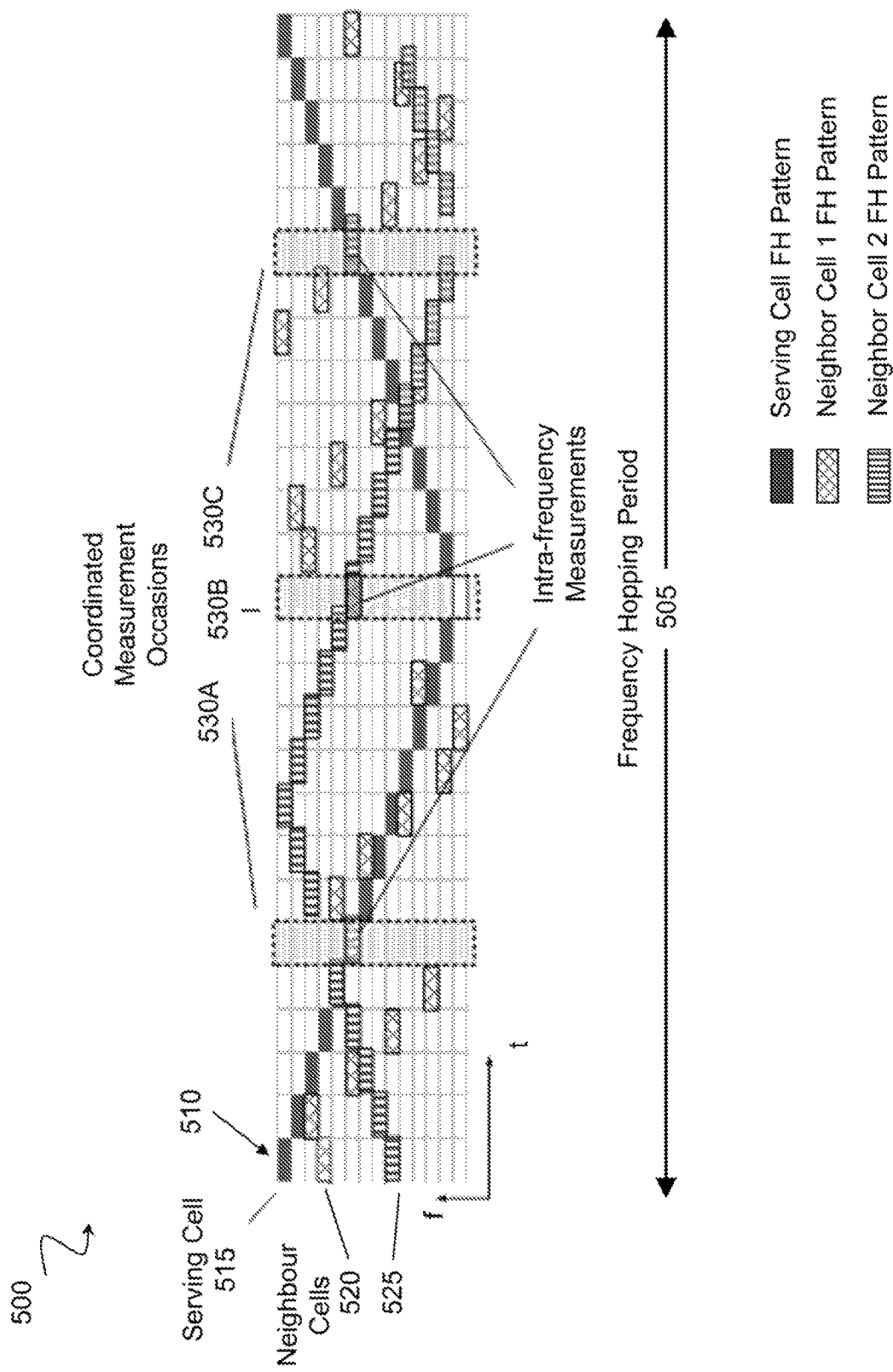
FIG. 5 illustrates a single frequency coordinated measurement occasion on a fixed frequency, in accordance with certain embodiments.

In the example of FIG. 4, each of the different cells 125A, 125B, and 125C associated with network nodes 115A, 115B, and 115C, respectively, communicate according to a different predetermined frequency hopping pattern during times outside of the coordinated measurement occasion. During the coordinated measurement occasion, however, at least one of the different cells 125 deviates from its predetermined frequency hopping pattern to one of the one or more common frequencies during the coordinated measurement occasion. This is illustrated in FIG. 5, described in more detail below.

In other words, at the coordinated measurement occasions, all cells (e.g., cells 125A, 125B, and 125C associated with network nodes 115A, 115B, and 115C, respectively) converge to one pre-configured frequency where each cell can transmit its DRS for wireless devices 110 to measure. This simplifies measurements for wireless devices 110, as all neighboring DRSs can be measured together in one measurement occasion.

In certain embodiments, the FHSS system of network 400 may be non-adaptive. In such a scenario, the DRSs transmitted by network nodes 115A, 115B, and 115C in their respective cells 125A, 125B, and 125C will potentially collide in the measurement occasion. In certain embodiments, each of network nodes 115A, 115B, and 115C will have different physical cell identifiers (PCIDs) for their respective transmissions. Thus, the potential collision of DRS transmissions in the coordinated measurement occasion is acceptable, because wireless devices 110 can distinguish between the reference signals transmitted form the different cells based on the PCIDs transmitted in conjunction with the reference signals.

In certain embodiments, the different cells 125 may transmit the reference signals according to distinct or random timing offsets within the coordinated measurement occasion to avoid collisions between the reference signals. The use of a distinct or random offset by each cell 125 in the coordinated measurement occasion may advantageously optimize performance by preventing collisions of the reference signals in the coordinated measurement occasion.

In certain embodiments, the common frequency used by wireless devices 110 for performing measurements on the reference signals transmitted by network nodes 115A, 115B, and 115C may have a known frequency hopping pattern. This would make the measurements similar to the demodulation aspect by adding frequency diversity in the measurements branch. This is described in more detail below in relation to FIG. 6.

In certain embodiments, the different cells 125 may perform LBT within the coordinated measurement occasion to avoid collisions between the reference signals. This may also advantageously avoid collisions between the reference signals transmitted by network nodes 115A, 115B, and 115C in their respective cells 125A, 125B, and 125C. Although FHSS systems operating in unlicensed bands do not have to follow the particular LBT rules of the operating band, in this case a voluntary LBT scheme is used. 3GPP has specified an LBT scheme for DRS (described in section 15.1.12 of 3GPP TS 36.213, 3$^{rd}$ Generation Partnership Project; Technical Specification Group Radio Access Network; Evolved Universal Terrestrial Radio Access (E-UTRA); Physical Layer Procedures) which would be suitable to be used in this situation. This is described in more detail below in relation to FIG. 7.

In certain embodiments, the one or more common frequencies used during the coordinated measurement occasion may be chosen from a limited set of frequencies. In such a scenario, each of the network nodes 115 associated with the different cells 125 selects a frequency to use to transmit its associated reference signal during the coordinated measurement occasion from the one or more common frequencies defined in the configuration. Then, at the coordinated measurement occasions, cells 125A, 125B, and 125C converge to one of several pre-configured frequencies where each network node 115 can transmit its DRS in its respective cell 125 for wireless devices 110 to measure. In some cases, each network node 115 selects the frequency to use to transmit its respective reference signal in its associated cell during the coordinated measurements occasion independently such that the plurality of reference signals are transmitted on different frequencies. Such an approach can be useful in dense deployments to spread out the DRSs and avoid interference. This is described in more detail below in relation to FIG. 8.

In certain embodiments, the common frequency may be a native frequency of at least one of the different cells 125A, 125B, 125C. The native frequency may be a frequency within a frequency hopping pattern of at least one of the different cells (e.g., cell 125A associated with network node 115A). In such a scenario, for example, network node 115A associated with cell 125A would not have to deviate from its natural frequency hopping pattern. In certain embodiments, for each coordinated measurement occasion, a different cell 125 in the area could be chosen for the native frequency. An advantage in this scheme is that some regulations stipulate that all frequencies must be visited evenly. This is described in more detail below in relation to FIG. 9.

In certain embodiments, the use of the coordinated measurement occasions may be restricted to a particular area. The area to which the use of coordinated measurement occasions may be restricted is referred to herein as a measurement coordination area. In such a scenario, the one or more common frequencies and/or the hopping pattern of the one or more common frequencies is shared and coordinated in the measurement coordination area. For example, network nodes 115A, 115B, and 115C and their associated cells 125A, 125B, and 125C may be grouped in a measurement coordination area, and the configuration of the coordinated measurement occasion determined by network node 115A described above may be shared within the measurement coordination area (e.g., amongst network nodes 115A, 115B, and 115C). In some cases, when network nodes 115A, 115B, and 115C and their associated cells 125A, 125B, and 125C are grouped in a measurement coordination area, one or more of network nodes 115A, 115B, and 115C may collaborate to determine the configuration of the coordinated measurement occasion (e.g., by sharing their frequency hopping patterns and negotiating the configuration of the coordinated measurement occasion). Such an approach may be advantageous in areas where there is a need for high mobility.

In some cases, it may be difficult for network nodes 115 operating cells 125 in unlicensed spectrum to synchronize with neighbor cells. Because network nodes 115 operating in unlicensed spectrum cannot expect to be tightly synchronized with neighbor cells, in certain embodiments the coordinated measurement occasions may be of a configurable size, for example relative to the level of synchronization available. In certain embodiments, the measurement occasion can be contained in one time interval (also referred to as a dwell) or several time intervals depending on the level of synchronization and priority of mobility in the area.

In some cases, because the reference signals transmitted in the coordinated measurement occasion do not follow the natural frequency hopping pattern of cells 125, a wireless device 110 that has not yet synchronized to the network may interpret the reference signal with the wrong frequency hopping timing of a cell 125. To address this issue, in certain embodiments the frequencies chosen for the coordinated measurement occasion avoid the special synchronization frequencies that can be designated for a system. Another approach to addressing this issue is to broadcast (e.g., by one or more network nodes 115) information indicating that this instance of the reference signal may not be used for initial wireless device synchronization with respect to knowing the frequency hopping pattern timing. This information may be critical for wireless devices 110. In certain embodiments, the information may be included in a System Information Block (SIB) contained in the reference signal. Wireless devices 110 could also use other information from detecting this reference signal (e.g., for gain, frequency and timing) to continue the procedures for finding a cell. In certain embodiments, certain synchronization signals may be included or omitted from the reference signal contained in the measurement occasion so that a wireless device 110 can know not to assume any frequency hopping pattern timing.

FIG. 5 illustrates a single frequency coordinated measurement occasion on a fixed frequency, in accordance with certain embodiments. FIG. 5 illustrates time-frequency grid 500 for frequency hopping period 505. Frequency hopping period 505 is divided into a plurality of time intervals 510. FIG. 5 illustrates the frequency hopping pattern of the serving cell 515, as well as frequency hopping pattern of a first neighbor cell 520 and frequency hopping pattern of a second neighbor cell 525. As can be seen from the example of FIG. 5, frequency hopping patterns 515, 520, and 525 (for the serving cell, first neighbor cell, and second neighbor cell, respectively) are different.

Figure 3:
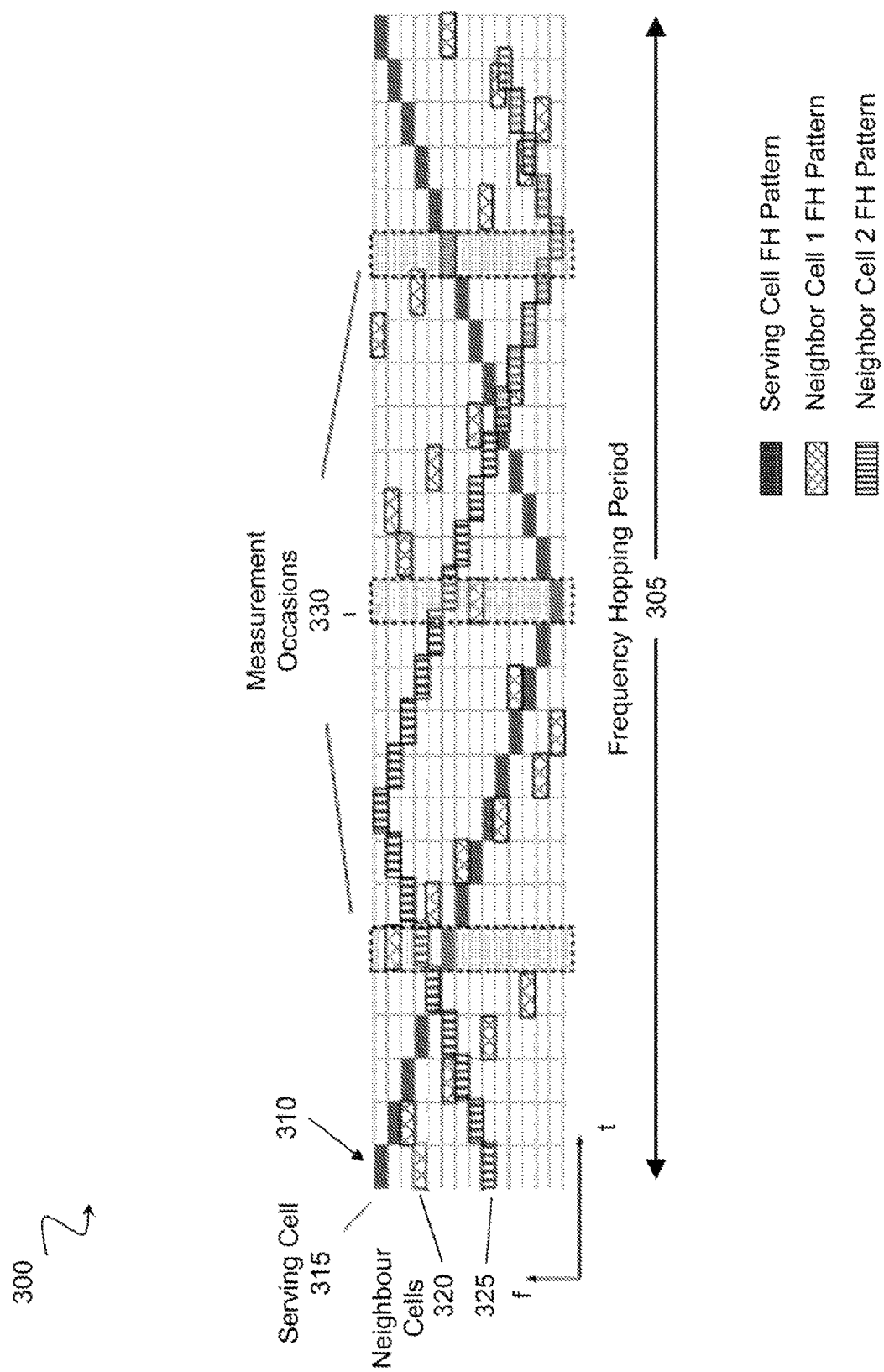
FIG. 3 illustrates an example of the measurement occasions in a FHSS system.

Consistent with the example embodiments described above in relation to FIG. 4 (an in contrast to the example of FIG. 3 above), the example embodiment of FIG. 5 employs a number of coordinated measurement occasions 530A-C. Although serving cell 515, first neighbor cell 520, and second neighbor cell 525 generally communicate according to different predetermined frequency hopping patterns during times outside of the coordinated measurement occasion, during coordinated measurement occasions 530A-C, serving cell 515, first neighbor cell 520, and second neighbor cell 525 converge to a common frequency (i.e., one pre-configured frequency where each cell can transmit its reference signal (e.g., DRS)) for a wireless devices (e.g., a UE) to measure. This simplifies measurements for wireless devices, as all neighboring reference signals can be measured together in one measurement occasion.

Because serving cell 515, first neighbor cell 520, and second neighbor cell 525 converge to the same frequency during coordinated measurement occasions 530, the example of FIG. 5 illustrates an example in which an intra-frequency measurement would be performed by a wireless device during coordinated measurement occasions 530. As noted above, however, in certain embodiments, the FHSS system may be non-adaptive. In such a scenario, the reference signals transmitted in serving cell 515, first neighbor cell 520, and second neighbor cell 525 will potentially collide in measurement occasions 530. As described above, in some cases the reference signal transmissions may be distinguishable by a wireless device based on the PCID of each respective transmission. In certain embodiments, serving cell 515, first neighbor cell 520, and second neighbor cell 525 may transmit their respective reference signals according to distinct or random timing offsets within coordinated measurement occasions 5350 to avoid collisions between the reference signals. This can be seen in measurement occasion 530C in the example of FIG. 5, in which the reference signal for second neighbor cell 525 is offset from the transmissions of serving cell 515 and first neighbor cell 520. As described above, the use of a distinct or random offset by each cell in the measurement occasion may advantageously optimize performance by preventing collisions of the reference signals in the measurement occasion.

Figure 6:
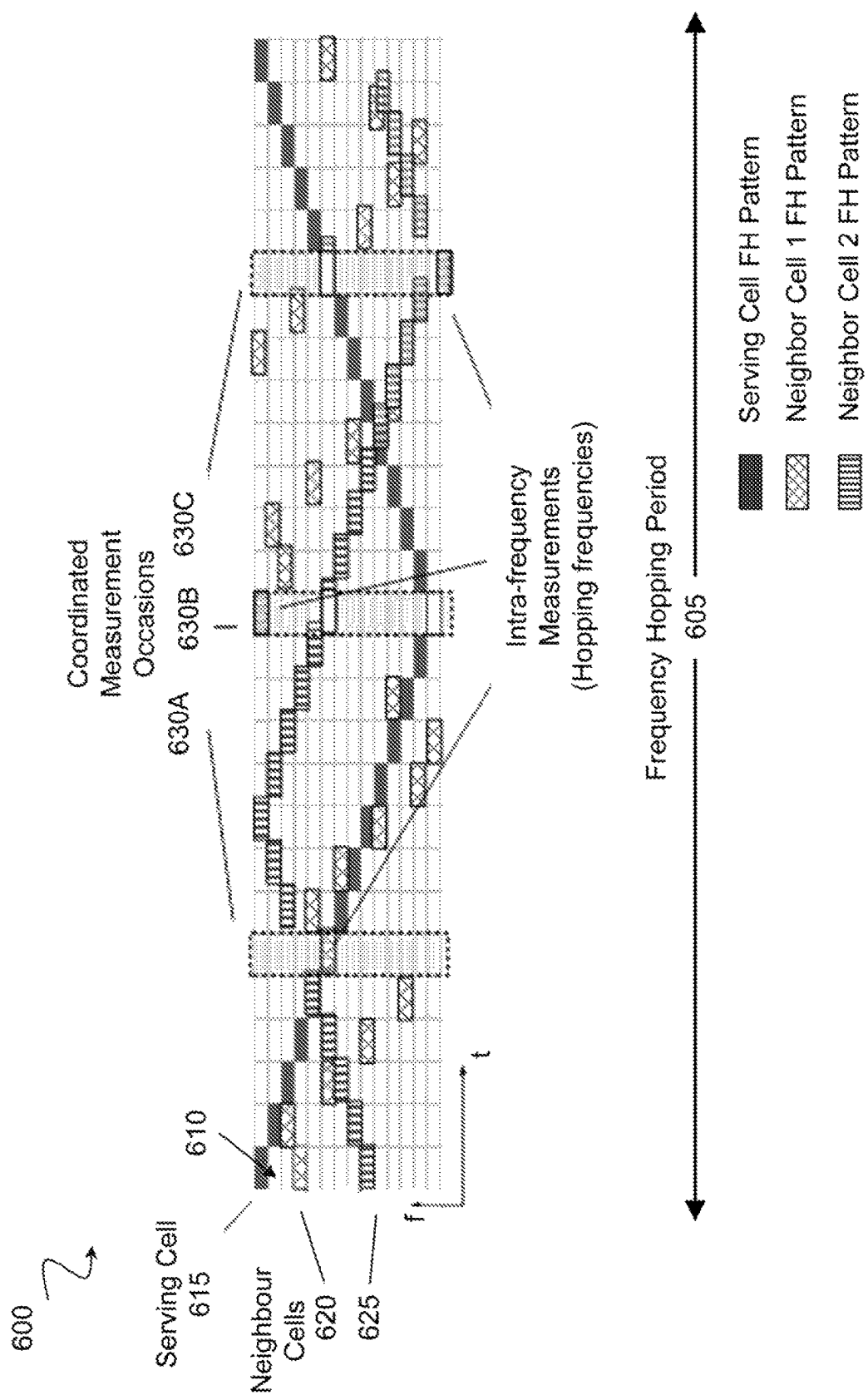
FIG. 6 illustrates a single frequency coordinated measurement occasion on hopping frequencies, in accordance with certain embodiments.

FIG. 6 illustrates a single frequency coordinated measurement occasion on hopping frequencies, in accordance with certain embodiments. FIG. 6 is similar to FIG. 5 above in that it illustrates time-frequency grid 600 for frequency hopping period 605. Frequency hopping period 605 is divided into a plurality of time intervals 610. FIG. 6 illustrates the frequency hopping pattern of serving cell 615, as well as frequency hopping pattern of a first neighbor cell 620 and frequency hopping pattern of a second neighbor cell 625. As can be seen from the example of FIG. 6, frequency hopping patterns 615, 620, and 625 (for the serving cell, first neighbor cell, and second neighbor cell, respectively) are different. Because serving cell 615, first neighbor cell 620, and second neighbor cell 625 converge to the same frequency during coordinated measurement occasions 630, the example of FIG. 6 illustrates an example in which an intra-frequency measurement would be performed by a wireless device during coordinated measurement occasions 630.

Consistent with the example embodiments described above in relation to FIG. 5, the example embodiment of FIG. 6 employs a number of coordinated measurement occasions 630. Although serving cell 515, first neighbor cell 520, and second neighbor cell 525 generally communicate according to different predetermined frequency hopping patterns during times outside of coordinated measurement occasions 630, during coordinated measurement occasions 630A-C, serving cell 615, first neighbor cell 620, and second neighbor cell 625 converge to a common frequency (i.e., one pre-configured frequency where each cell can transmit its reference signal (e.g., DRS)) for a wireless devices (e.g., a UE) to measure.

In contrast to the example of FIG. 5, however, in the example embodiment of FIG. 6 the common frequency used by serving cell 615, first neighbor cell 620, and second neighbor cell 625 (and by wireless devices for performing measurements on the reference signals transmitted in each of the cells) has a known frequency hopping pattern. As can be seen from FIG. 6, the frequency used during coordinated measurement occasion 630A is different than the frequency used during coordinated measurement occasion 630B, and the frequency used during coordinated measurement occasion 630C is different from the frequency used during coordinated measurement occasions 630B and 630C.

Figure 7:
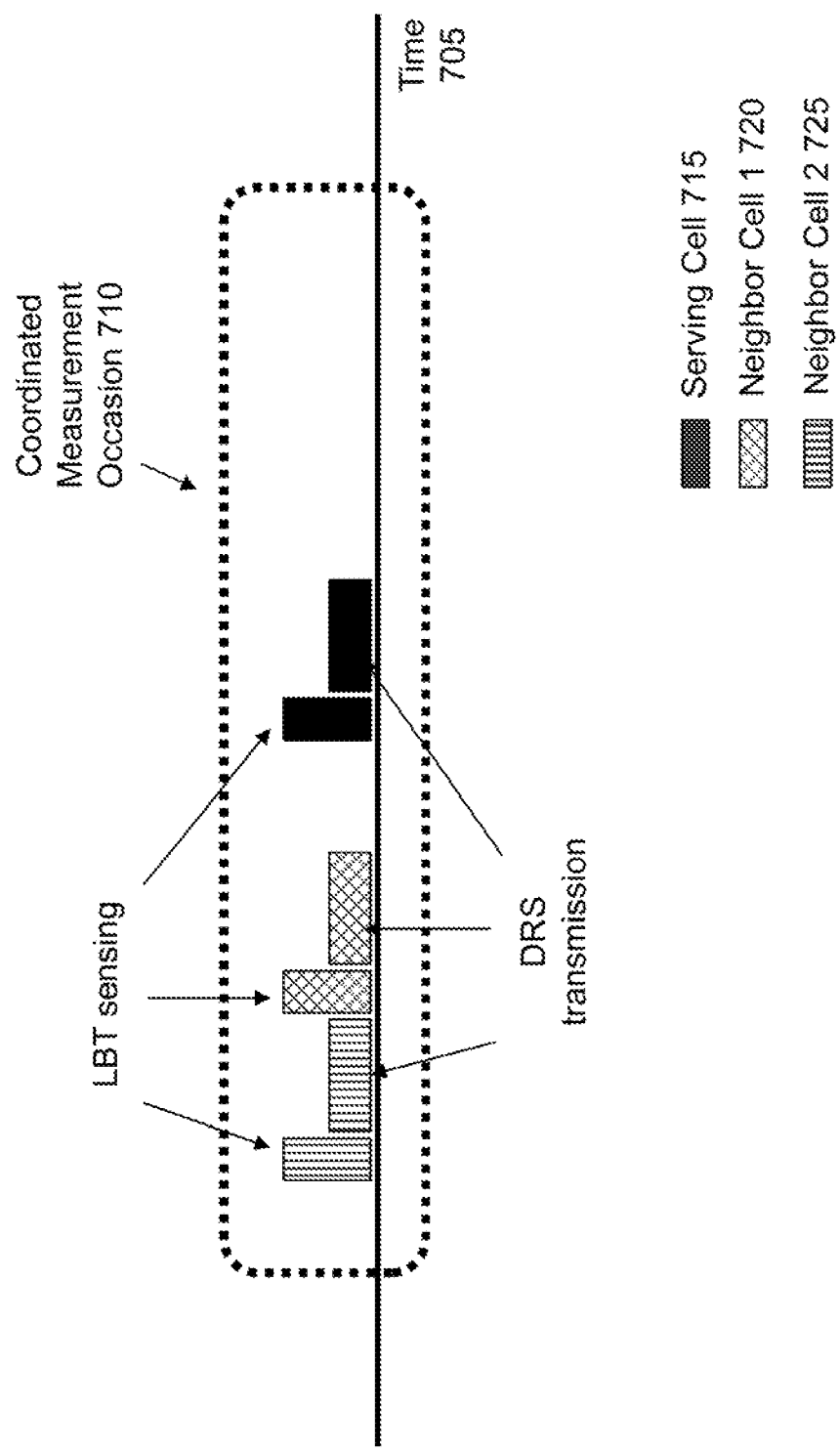
FIG. 7 illustrates LBT for reference signal transmission inside a coordinated measurement occasion, in accordance with certain embodiments.

FIG. 7 illustrates LBT for reference signal transmission inside a coordinated measurement occasion, in accordance with certain embodiments. As described above in relation to FIG. 4, in certain embodiments the different cells may perform LBT within the coordinated measurement occasion to avoid collisions between the reference signals. In the example of FIG. 7, time is shown on the x-axis 705. During coordinated measurement occasion 710, serving cell 715, first neighbor cell 720, and second neighbor cell 725 perform LBT sensing before transmitting their respective reference signal. In the example of FIG. 7, second neighbor cell 725 performs LBT sensing first, and upon determining that the channel is clear, transmits its respective reference signal (e.g., DRS). Next, first neighbor cell 720 performs LBT sensing, and upon determining that the channel is clear, transmits its respective reference signal. Finally, serving cell 715 performs LBT sensing, and upon determining that the channel is clear, transmits its respective reference signal. If, for example, either of first neighbor cell 720 and serving cell 715 were to perform their LBT sensing during reference signal transmission by second neighbor cell 725, the LBT sensing would reveal that the channel is not clear and thus first neighbor cell 720 and serving cell 715 would be unable to transmit until a later time. This may advantageously avoid collisions between the reference signals transmitted in serving cell 715, first neighbor cell 720, and second neighbor cell 725.

Figure 8:
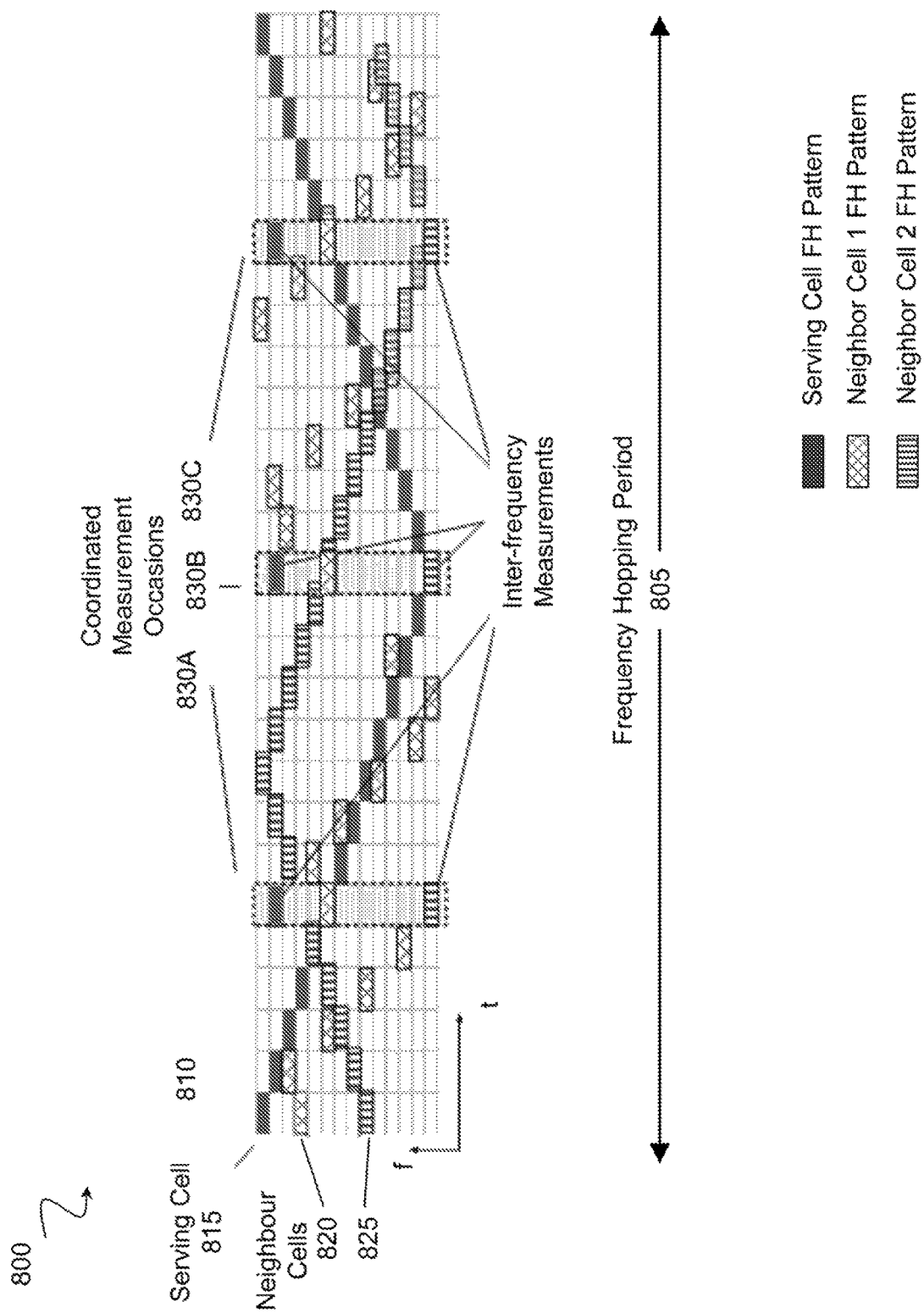
FIG. 8 illustrates multiple frequency coordinated measurement occasions, in accordance with certain embodiments.

FIG. 8 illustrates multiple frequency coordinated measurement occasions, in accordance with certain embodiments. FIG. 8 is similar to FIGS. 5 and 6 above in that it illustrates time-frequency grid 800 for frequency hopping period 805. Frequency hopping period 805 is divided into a plurality of time intervals 810. FIG. 8 illustrates the frequency hopping pattern of serving cell 815, as well as frequency hopping pattern of a first neighbor cell 820 and frequency hopping pattern of a second neighbor cell 825. As can be seen from the example of FIG. 8, frequency hopping patterns 815, 820, and 825 (for the serving cell, first neighbor cell, and second neighbor cell, respectively) are different.

Consistent with the example embodiments described above in relation to FIGS. 4-6, the example embodiment of FIG. 8 employs a number of coordinated measurement occasions 830. In contrast to the example of FIGS. 5 and 6, however, in the example embodiment of FIG. 8 a plurality of common frequencies are used during the coordinated measurement occasion that are chosen by serving network cell 815, first neighbor cell 820, and second neighbor cell 825 from a limited set of frequencies. In the example illustrated in FIG. 8, each of serving cell 815, first neighbor cell 820, and second neighbor cell 825 select a frequency to use to transmit their associated reference signal during coordinated measurement occasions 830 from the one or more common frequencies defined in the configuration. Then, at the coordinated measurement occasions 830A-C, serving cell 815, first neighbor cell 820, and second neighbor cell 825 converge to one of the pre-configured frequencies where each can transmit its reference signal for wireless devices to measure.

In some cases, each of serving cell 815, first neighbor cell 820, and second neighbor cell 825 may select the frequency to use to transmit its associated reference signal during coordinated measurement occasions 830 independently, such that the plurality of reference signals are transmitted on different frequencies. As can be seen in the example of FIG. 8, during coordinated measurement occasions 830A-C each of serving cell 815, first neighbor cell 820, and second neighbor cell 825 transmit their respective reference signal on a different frequency. Such a scenario would be an example of an inter-frequency measurement by a wireless device during coordinated measurement occasions 830. The approach illustrated in FIG. 8 can be useful in dense deployments to spread out the reference signals and avoid interference.

Figure 9:
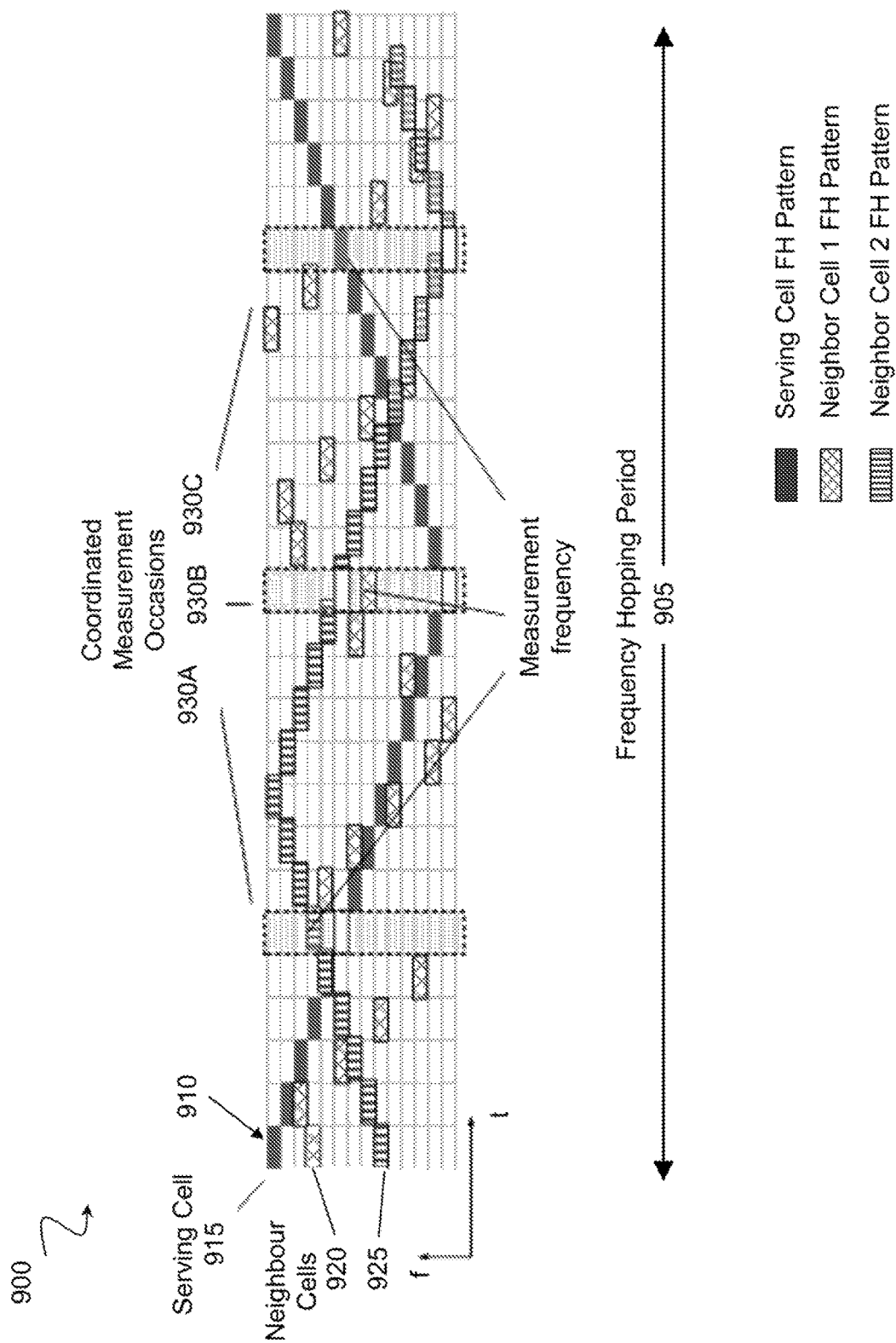
FIG. 9 illustrates native frequency coordinated measurement occasions, in accordance with certain embodiments.

FIG. 9 illustrates native frequency coordinated measurement occasions, in accordance with certain embodiments. Similar to FIGS. 5-6 and 8 described above, FIG. 9 illustrates time-frequency grid 900 for frequency hopping period 905. Frequency hopping period 905 is divided into a plurality of time intervals 910. FIG. 9 illustrates the frequency hopping pattern of the serving cell 915, as well as frequency hopping pattern of a first neighbor cell 920 and frequency hopping pattern of a second neighbor cell 925. As can be seen from the example of FIG. 9, frequency hopping patterns for serving cell 915, first neighbor cell 920, and second neighbor cell 925 are different.

Consistent with the example embodiments described above in relation to FIGS. 4-6 and 8, the example embodiment of FIG. 9 employs a number of coordinated measurement occasions 930. Although serving cell 915, first neighbor cell 920, and second neighbor cell 925 generally communicate according to different predetermined frequency hopping pattern during times outside of coordinated measurement occasions 930, during coordinated measurement occasions 930A-C, serving cell 915, first neighbor cell 920, and second neighbor cell 925 converge to a common frequency for a wireless device to measure.

In the example embodiment of FIG. 9, the common frequency in each coordinated measurement occasion 930 is a native frequency of at least one of serving cell 915, first neighbor cell 920, and second neighbor cell 925. In the example of FIG. 9, the native frequency is a frequency within a frequency hopping pattern of at least one of serving cell 915, first neighbor cell 920, and second neighbor cell 925. Thus, in the scenario illustrated in FIG. 9, at least one of serving cell 915, first neighbor cell 920, and second neighbor cell 925 does not have to deviate from its natural frequency hopping pattern during a coordinated measurement occasion 930. In certain embodiments, for each coordinated measurement occasion, a different cell in the area could be chosen for the native frequency. For example, in coordinated measurement occasion 930A, the common frequency is a native frequency of the frequency hopping pattern of second neighbor cell 925. In coordinated measurement occasion 930B, the common frequency is a frequency of first neighbor cell 920. In coordinated measurement occasion 930C, the common frequency is a native frequency of the frequency hopping pattern of serving cell 915. An advantage in this scheme is that some regulations stipulate that all frequencies must be visited evenly.

Figure 10:
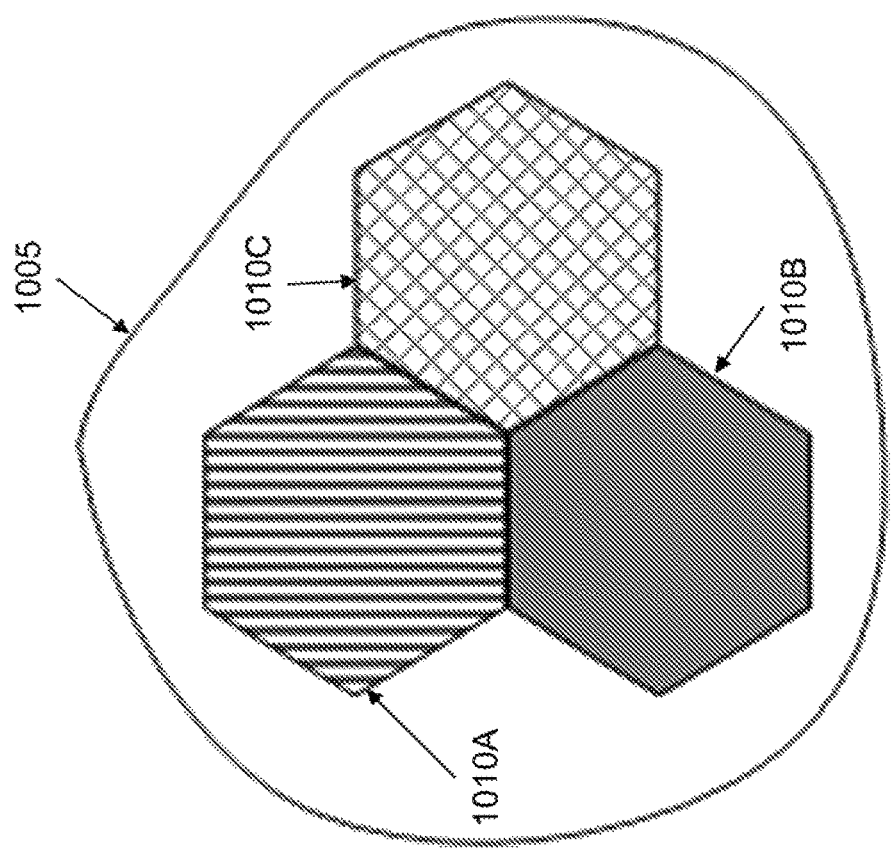
FIG. 10 illustrates an example of a shared measurement area, in accordance with certain embodiments.

FIG. 10 illustrates an example of a shared measurement area, in accordance with certain embodiments. As described above in relation to FIG. 4, in certain embodiments the use of the coordinated measurement occasions may be restricted to a particular measurement coordination area. FIG. 10 illustrates a measurement coordination area 1005 that includes a plurality of cells 1010A, 1010B, and 1010C. In the example of FIG. 10, the one or more common frequencies and/or the hopping pattern of the one or more common frequencies is shared and coordinated with the plurality of cells 101A, 1010B, and 1010C in measurement coordination area 1005. Each of cells 1010A, 1010B, and 1010C may have a network node associated with it. In some cases, one of the network nodes associated with one of cells 1010A, 1010B, and 1010C may determine a configuration of a coordinated measurement occasion and communicate it to the other cells 1010 in measurement coordination area 1005. In some cases, the network nodes associated with cells 1010 may cooperate in order to determine the configuration of the coordinated measurement occasion. Having determined the configuration of the coordinated measurement occasion, reference signal transmission in cells 1010A-C in coordinated measurement area 1005 may be performed in accordance with the configuration (for example, as described above in relation to FIGS. 4-9). Such an approach may be advantageous in areas where there is a need for high mobility.

Figure 11:
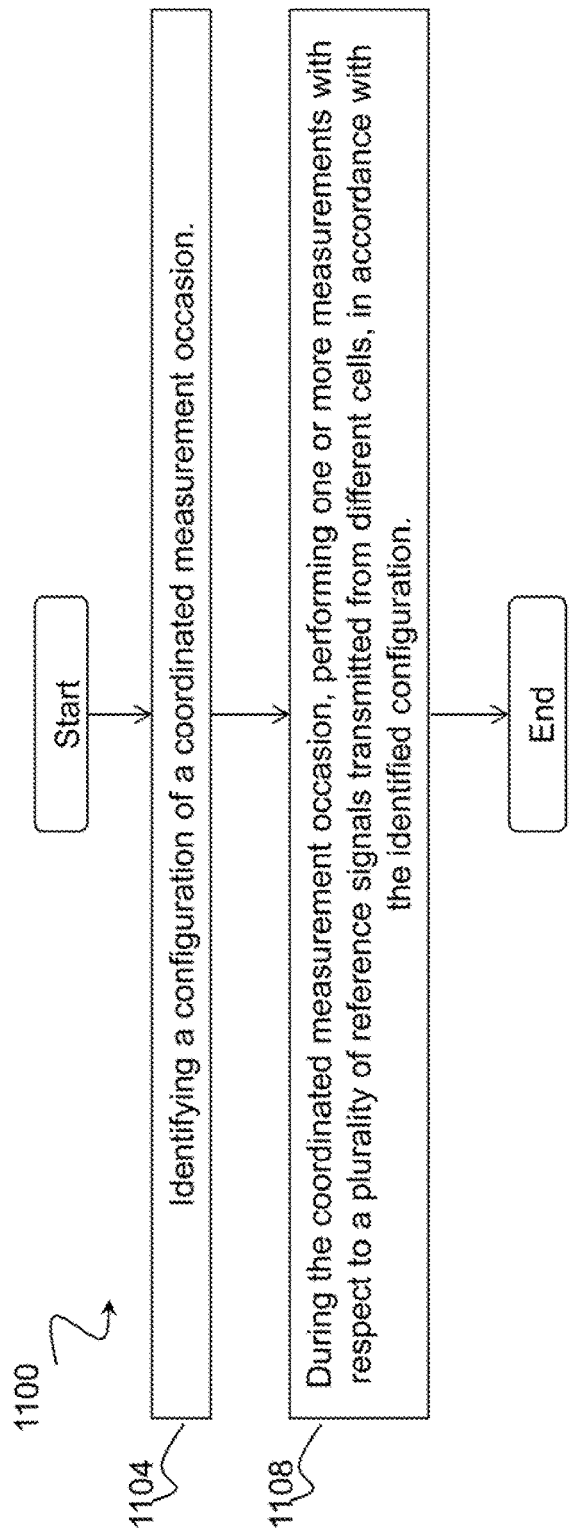
FIG. 11 is a flow diagram of a method in a wireless device, in accordance with certain embodiments.

FIG. 11 is a flow diagram of a method 1100 in a wireless device, in accordance with certain embodiments. Method 1100 begins at step 1104, where the wireless device identifies a configuration of a coordinated measurement occasion. In certain embodiments, identifying the configuration of the coordinated measurement occasion may comprise one of: determining the configuration of the coordinated measurement occasion; accessing the configuration of the coordinated measurement occasion from a memory of the wireless device; and receiving an indication of the configuration of the coordinated measurement occasion. In certain embodiments, the wireless device may be preconfigured with the configuration of the coordinated measurement occasion.

In certain embodiments, the wireless device may communicate according to a predetermined frequency hopping pattern during times outside of the coordinated measurement occasion, and may deviate from the predetermined frequency hopping pattern to the one or more common frequencies during the coordinated measurement occasion. In certain embodiments, the configuration may further define a frequency hopping pattern for changing the common frequency between different coordinated measurement occasions.

At step 1108, the wireless device, during the coordinated measurement occasion, performs one or more measurements with respect to a plurality of reference signals transmitted from different cells, in accordance with the identified configuration. Each of the different cells may be associated with at least one of the plurality of reference signals. The configuration may define a common time interval and one or more common frequencies for the different cells to transmit their respective associated reference signal during the coordinated measurement occasion.

In certain embodiments, the plurality of reference signals may comprise discovery reference signals. In certain embodiments, each of the different cells may communicate according to a different predetermined frequency hopping pattern during times outside of the coordinated measurement occasion, and at least one of the different cells may deviate from its predetermined frequency hopping pattern to one of the one or more common frequencies during the coordinated measurement occasion.

In certain embodiments, the method may comprise identifying the coordinated measurement occasion. The one or more measurements may be performed in response to identifying the coordinated measurement occasion.

In certain embodiments, the method may comprise distinguishing between the reference signals transmitted from the different cells based on physical cell identifiers transmitted in conjunction with the reference signals.

In certain embodiments, the one or more different cells may perform listen-before-talk within the coordinated measurement occasion to avoid collisions between the reference signals. In certain embodiments, the different cells may transmit the reference signals according to distinct or random timing offsets within the coordinated measurement occasion to avoid collisions between the reference signals. In certain embodiments, each of the different cells may select a frequency to use to transmit its associated reference signal during the coordinated measurement occasion from the one or more common frequencies defined in the configuration. Each of the different cells may select the frequency to use to transmit its associated reference signal during the coordinated measurements occasion independently such that the plurality of reference signals are transmitted on different frequencies.

In certain embodiments, the common frequency may be a native frequency of at least one of the different cells. The native frequency may be a frequency within a frequency hopping pattern of the at least one of the different cells.

Figure 12:
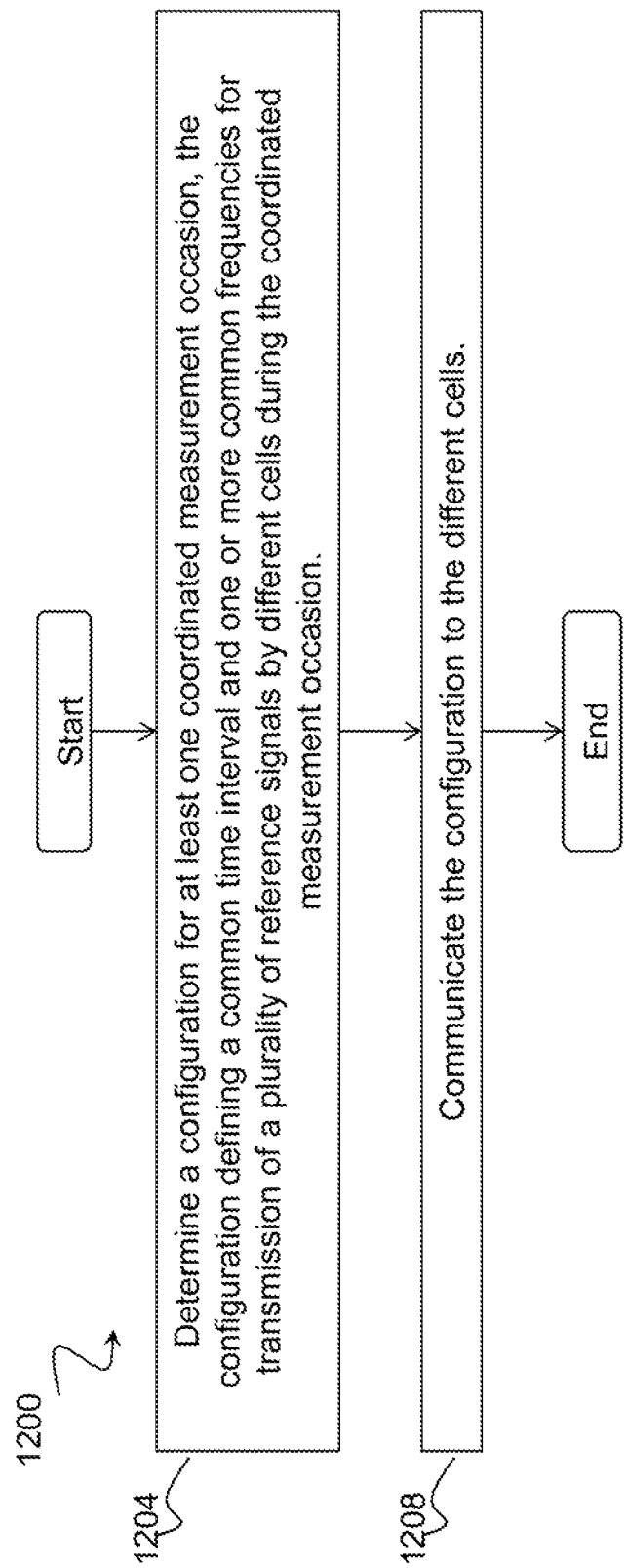
FIG. 12 is a flow diagram of a method in a network node, in accordance with certain embodiments.

FIG. 12 is a flow diagram of a method in a network node, in accordance with certain embodiments. Method 1200 begins at step 1204, where the network node determines a configuration for at least one coordinated measurement occasion, the configuration defining a common time interval and one or more common frequencies for transmission of a plurality of reference signals by different cells during the coordinated measurement occasion, wherein each of the different cells transmits at least one of the plurality of reference signals.

In certain embodiments, the plurality of reference signals may comprise discovery reference signals. In certain embodiments, the configuration may further define a frequency hopping pattern for changing the common frequency between different coordinated measurement occasions. In certain embodiments, the common frequency may be a native frequency of at least one of the different cells. The native frequency may be a frequency within a frequency hopping pattern of the at least one of the different cells.

In certain embodiments, each of the different cells may communicate according to a different predetermined frequency hopping pattern during times outside of the coordinated measurement occasion, and at least one of the different cells may deviate from its predetermined frequency hopping pattern to one of the one or more common frequencies during the coordinated measurement occasion. In certain embodiments, the different cells may transmit the reference signals according to distinct or random timing offsets within the coordinated measurement occasion to avoid collisions between the reference signals. In certain embodiments, the one or more different cells may perform listen-before-talk within the coordinated measurement occasion to avoid collisions between the reference signals.

At step 1208, the network node communicates the configuration to the different cells.

In certain embodiments, each of the different cells may select a frequency to use to transmit its associated reference signal during the coordinated measurement occasion from the one or more common frequencies defined in the configuration. In certain embodiments, each of the different cells may select the frequency to use to transmit its associated reference signal during the coordinated measurements occasion independently such that the plurality of reference signals are transmitted on different frequencies.

Figure 13:
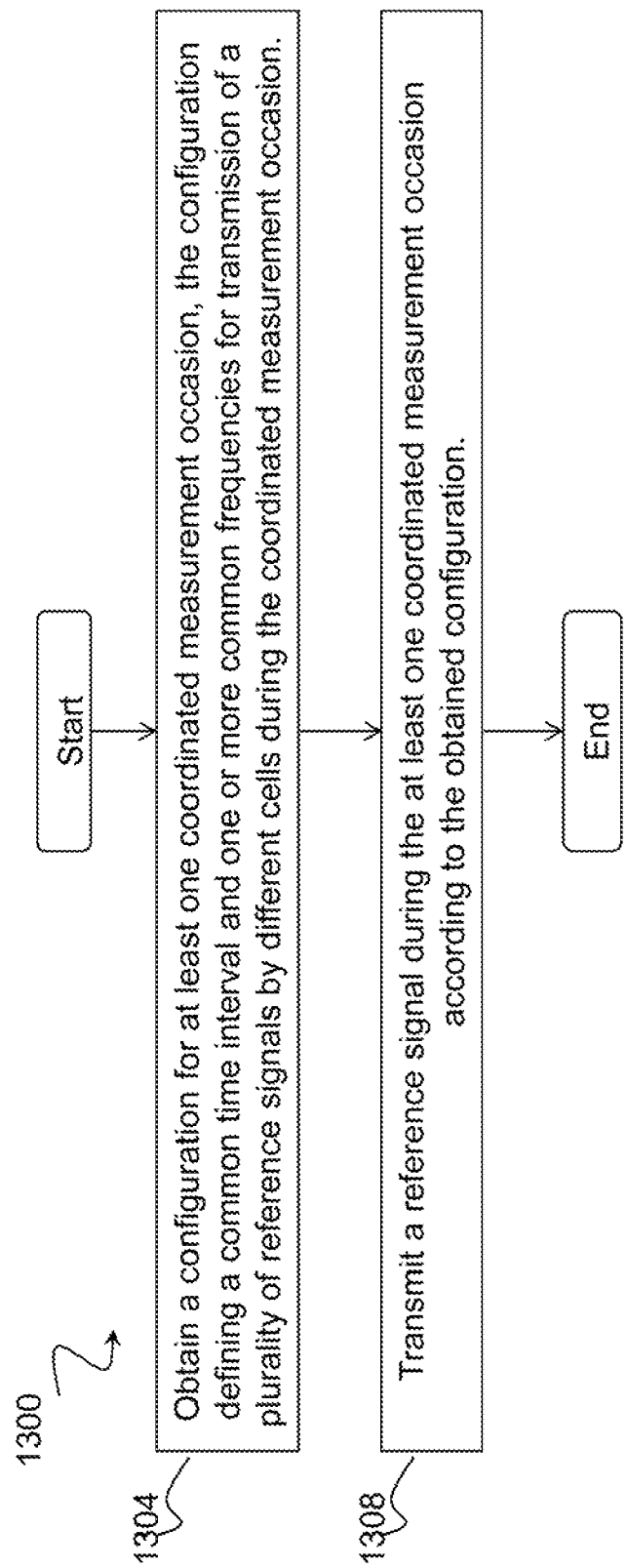
FIG. 13 is a flow diagram of a method in a network node, in accordance with certain embodiments.

FIG. 13 is a flow diagram of a method in a network node, in accordance with certain embodiments. Method 1300 begins at step 1304, where the network node obtains a configuration for at least one coordinated measurement occasion. The configuration may define a common time interval and one or more common frequencies for transmission of a plurality of reference signals by different cells during the coordinated measurement occasion. The different cells may comprise at least one cell associated with the network node. In certain embodiments, obtaining the configuration for the at least one coordinated measurement occasion may comprise one of: determining the configuration for the at least one coordinated measurement occasion; and receiving the configuration for the at least one coordinated measurement occasion from another network node.

In certain embodiments, the plurality of reference signals may comprise discovery reference signals. In certain embodiments, the configuration may further define a frequency hopping pattern for changing the common frequency between different coordinated measurement occasions.

In certain embodiments, the one or more different cells may communicate according to a predetermined frequency hopping pattern during times outside of the coordinated measurement occasion, and may deviate from the predetermined frequency hopping pattern to the one or more common frequencies during the coordinated measurement occasion. In certain embodiments, each of the different cells may communicate according to a different predetermined frequency hopping pattern during times outside of the coordinated measurement occasion, and at least one of the different cells may deviate from its predetermined frequency hopping pattern to the one or more common frequencies during the coordinated measurement occasion.

In certain embodiments, the method may comprise selecting a frequency to use to transmit the reference signal during the at least one coordinated measurement occasion from the one or more common frequencies defined in the configuration. The selected common frequency may be selected independently and may be different from the frequencies used by other cells of the different cells.

In certain embodiments, the common frequency may be a native frequency of the at least one cell associated with the network node. The native frequency may be a frequency within a frequency hopping pattern of the at least one cell associated with the network node.

At step 1308, the network node transmits a reference signal during the at least one coordinated measurement occasion according to the obtained configuration. In certain embodiments, the transmission of the reference signal according to the obtained configuration may be a deviation from a predetermined frequency hopping pattern of the at least one cell associated with the network node. In certain embodiments, the method may comprise identifying the coordinated measurement occasion, and the reference signal may be transmitted in response to identifying the coordinated measurement occasion. In certain embodiments, the method may comprise transmitting a physical cell identifier in conjunction with the reference signal transmitted according to the obtained configuration to enable the one or more wireless devices to distinguish between the plurality of reference signals transmitted by the different cells. In certain embodiments, the method may comprise performing listen-before-talk within the coordinated measurement occasion to avoid collisions between the plurality of reference signals transmitted by the different cells.

In certain embodiments, transmitting the reference signal during the at least one coordinated measurement occasion may comprise transmitting the reference signals according to a distinct or random timing offset within the coordinated measurement occasion to avoid collisions between the plurality reference signals transmitted by the different cells.

In certain embodiments, the method may comprise providing an indication of the configuration for the at least one coordinated measurement occasion to one or more wireless devices.

Figure 14:
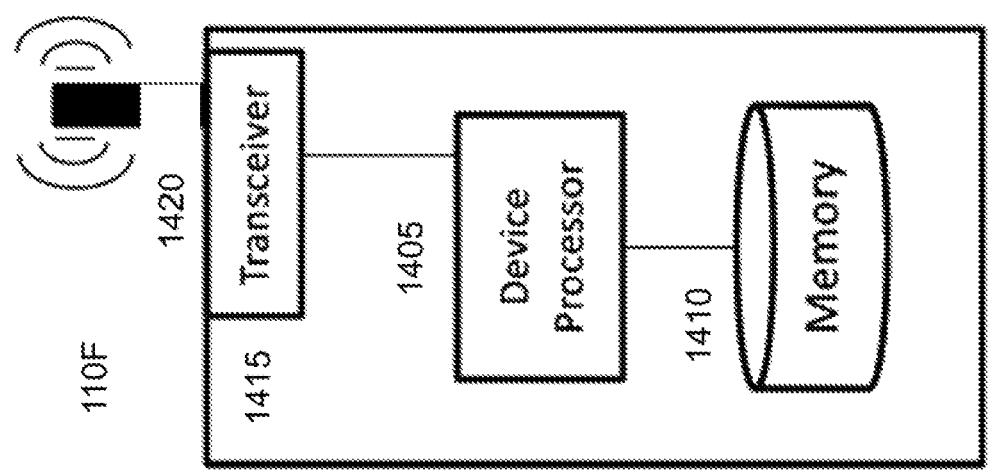
FIG. 14 illustrates a wireless communication device, in accordance with certain embodiments.

FIG. 14 illustrates a wireless communication device 110F, in accordance with certain embodiments. In the example of FIG. 14, a wireless communication device 110F comprises a processor 1405 (e.g., Central Processing Units (CPUs), Application Specific Integrated Circuits (ASICs), Field Programmable Gate Arrays (FPGAs), and/or the like), a memory 1410, a transceiver 1415, and an antenna 1420. In certain embodiments, some or all of the functionality described as being provided by UEs, MTC or M2M devices, and/or any other types of wireless communication devices may be provided by device processor 1405 executing instructions stored on a computer-readable medium, such as memory 1410. Alternative embodiments may include additional components beyond those shown in FIG. 14 that may be responsible for providing certain aspects of the functionality of device 110F, including any of the functionality described herein.

Figure 15:
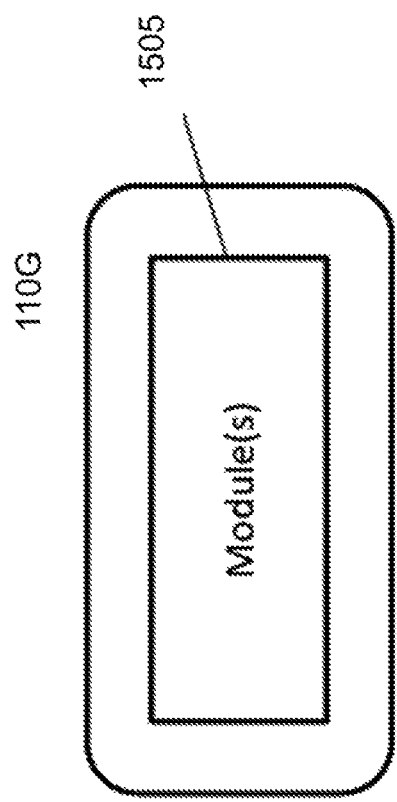
FIG. 15 illustrates a wireless communication device, in accordance with certain embodiments.

FIG. 15 illustrates a wireless communication device 110G, in accordance with certain embodiments. In the example of FIG. 15, wireless communication device 110G comprises at least one module 1505 configured to perform one or more corresponding functions. Examples of such functions include various method steps or combinations of method steps as described herein with reference to wireless communication device(s) 110. In general, a module may comprise any suitable combination of software and/or hardware configured to perform the corresponding function. For instance, in some embodiments a module comprises software configured to perform a corresponding function when executed on an associated platform, such as that illustrated in FIG. 14.

Figure 16:
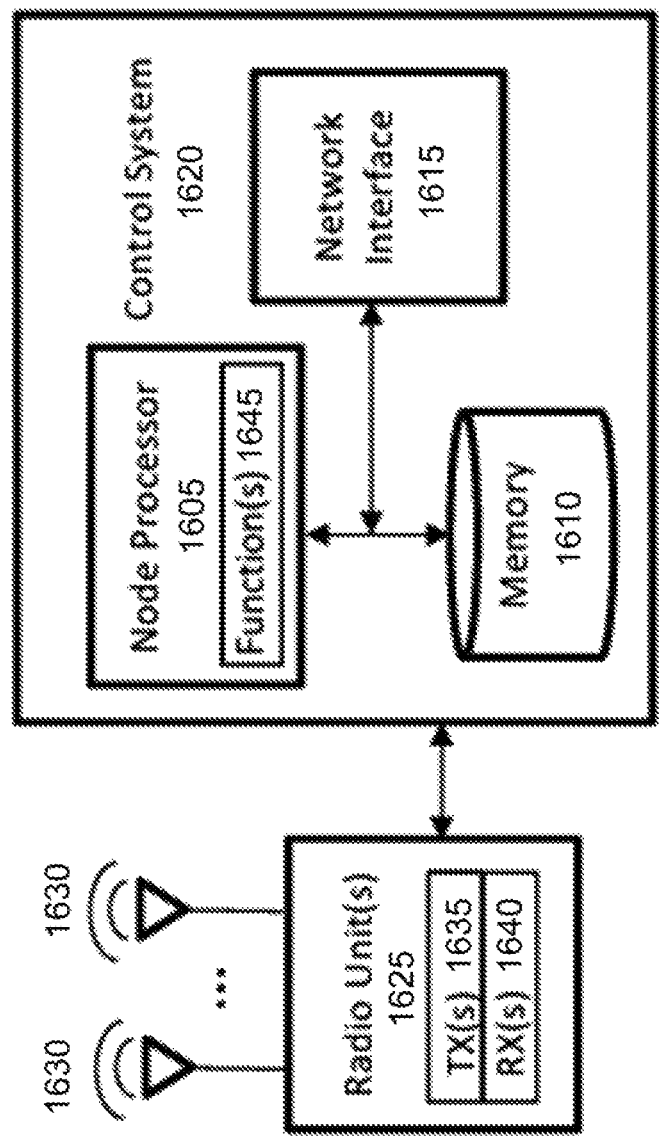
FIG. 16 illustrates a radio access node, in accordance with certain embodiments.

FIG. 16 illustrates a radio access node 115D, in accordance with certain embodiments. In the example of FIG. 16, radio access node 115D comprises a control system 1620 that comprises a node processor 1605 (e.g., CPUs, ASICs, FPGAs, and/or the like), memory 1610, and a network interface 1615. In addition, radio access node 115D comprises at least one radio unit 1625 comprising at least one transmitter 1635 and at least one receiver 1640 coupled to at least one antenna 1630. In some embodiments, radio unit 1625 is external to control system 1620 and connected to control system 1620 via, e.g., a wired connection (e.g., an optical cable). However, in some other embodiments, radio unit 1625 and potentially the antenna 1630 are integrated together with control system 1620. Node processor 1605 operates to provide at least one function 1645 of radio access node 115D as described herein. In some embodiments, the function(s) are implemented in software that is stored, e.g., in the memory 1610 and executed by node processor 1605.

In certain embodiments, some or all of the functionality described as being provided by a base station, a node B, an enodeB, and/or any other type of network node may be provided by node processor 1605 executing instructions stored on a computer-readable medium, such as memory 1610 shown in FIG. 16. Alternative embodiments of radio access node 115D may comprise additional components to provide additional functionality, such as the functionality described herein and/or related supporting functionality.

Figure 17:
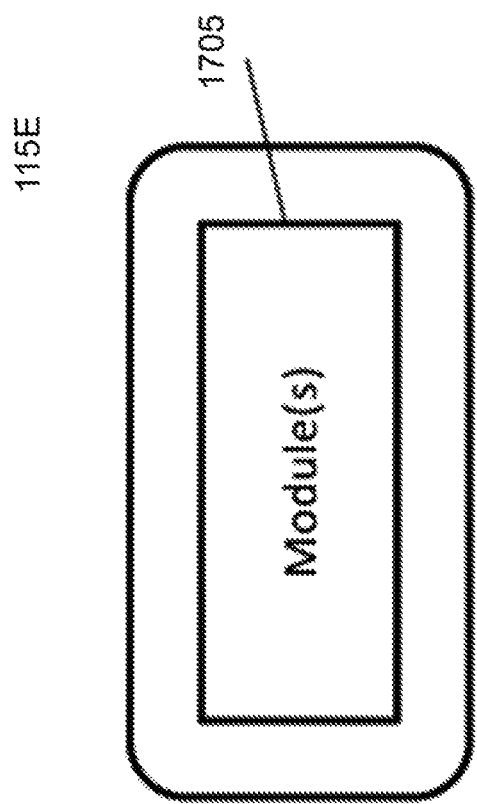
FIG. 17 illustrates a radio access node, in accordance with certain embodiments.

FIG. 17 illustrates a radio access node 115E, in accordance with certain embodiments. In the example of FIG. 17, radio access node 115E comprises at least one module 1705 configured to perform one or more corresponding functions. Examples of such functions include various method steps or combinations of method steps as described herein with reference to radio access node(s). In general, a module may comprise any suitable combination of software and/or hardware configured to perform the corresponding function. For instance, in some embodiments a module comprises software configured to perform a corresponding function when executed on an associated platform, such as that illustrated in FIG. 16.

Figure 18:
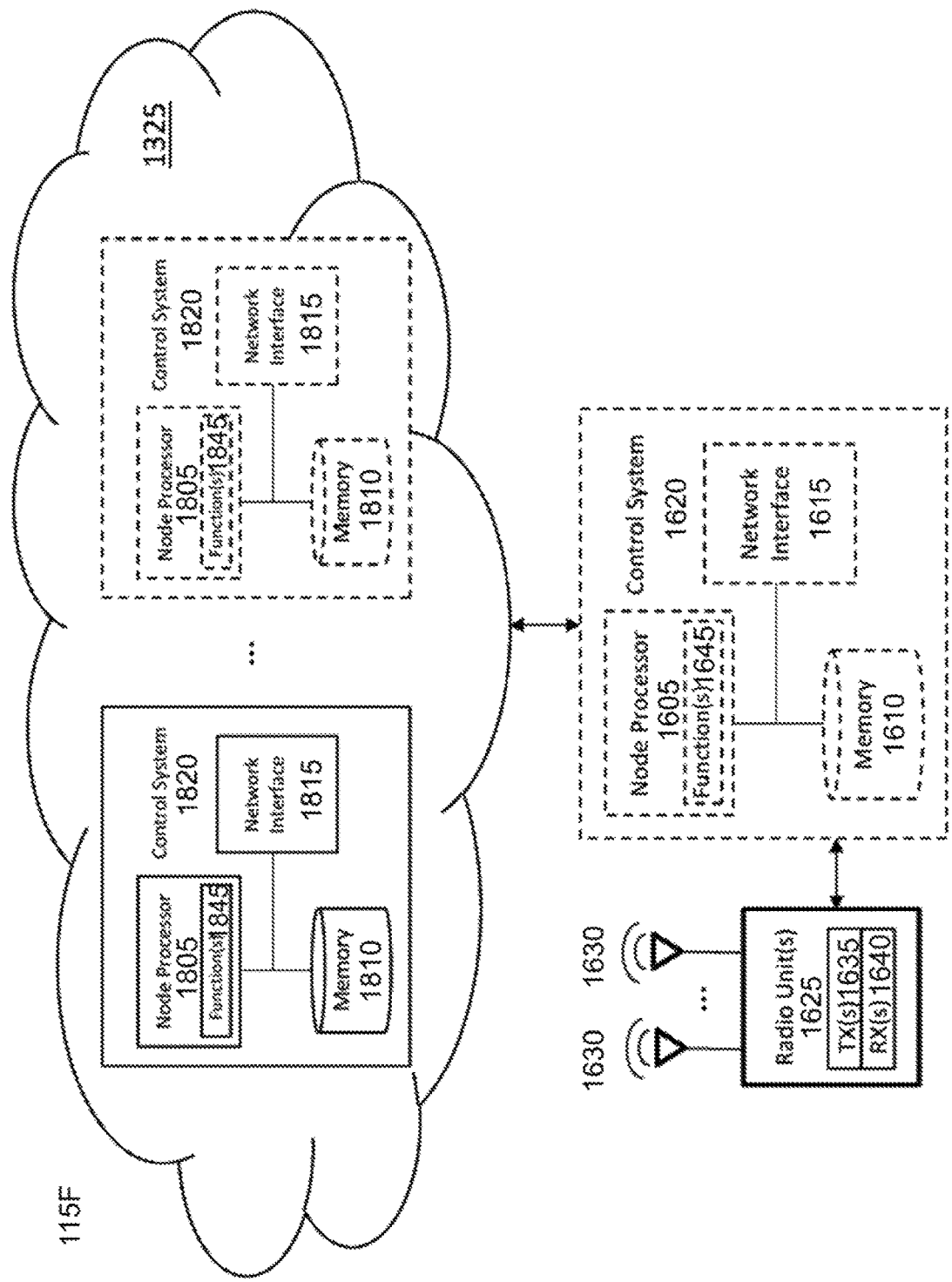
FIG. 18 illustrates a radio access node, in accordance with certain embodiments.

FIG. 18 illustrates a radio access node 115F, in accordance with certain embodiments. More particularly, FIG. 18 is a block diagram that illustrates a virtualized radio access node 115F according to an example embodiment of the disclosed subject matter. The concepts described in relation to FIG. 18 may be similarly applied to other types of network nodes. Further, other types of network nodes may have similar virtualized architectures. As used herein, the term "virtualized radio access node" refers to an implementation of a radio access node in which at least a portion of the functionality of the radio access node is implemented as a virtual component(s) (e.g., via a virtual machine(s) executing on a physical processing node(s) in a network(s)).

Referring to FIG. 18, radio access node 115F comprises control system 1620 as described above in relation to FIG. 16.

Control system 1620 is connected to one or more processing nodes 1820 coupled to or included as part of a network(s) 1825 via network interface 1615. Each processing node 1820 comprises one or more processors 1805 (e.g., CPUs, ASICs, FPGAs, and/or the like), memory 1810, and a network interface 1815.

In this example, functions 1645 of radio access node 115F described herein are implemented at the one or more processing nodes 1820 or distributed across control system 1620 and the one or more processing nodes 1820 in any desired manner. In some embodiments, some or all of the functions 1645 of radio access node 115F described herein are implemented as virtual components executed by one or more virtual machines implemented in a virtual environment(s) hosted by processing node(s) 1820. As will be appreciated by one of ordinary skill in the art, additional signaling or communication between processing node(s) 1820 and control system 1620 is used to carry out at least some of the desired functions 1645. As indicated by dotted lines, in some embodiments control system 1620 may be omitted, in which case the radio unit(s) 1625 communicate directly with the processing node(s) 1820 via an appropriate network interface(s).

In some embodiments, a computer program comprises instructions which, when executed by at least one processor, causes at least one processor to carry out the functionality of a radio access node (e.g., radio access node 115) or another node (e.g., processing node 1820) implementing one or more of the functions of the radio access node in a virtual environment according to any of the embodiments described herein.

Figure 19:
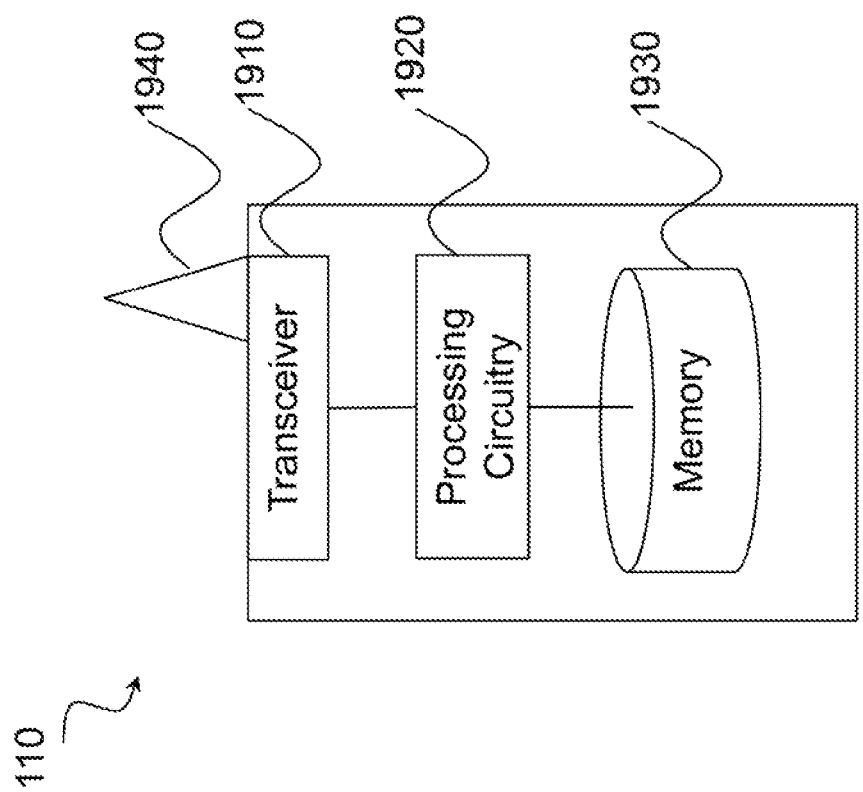
FIG. 19 is a block schematic of an exemplary wireless device, in accordance with certain embodiments.

FIG. 19 is a block schematic of an exemplary wireless device, in accordance with certain embodiments. Wireless device 110 may refer to any type of wireless device communicating with a node and/or with another wireless device in a cellular or mobile communication system. Examples of wireless device 110 include a mobile phone, a smart phone, a PDA (Personal Digital Assistant), a portable computer (e.g., laptop, tablet), a sensor, a modem, a machine-type-communication (MTC) device/machine-to-machine (M2M) device, laptop embedded equipment (LEE), laptop mounted equipment (LME), USB dongles, a D2D capable device, or another device that can provide wireless communication. A wireless device 110 may also be referred to as UE, a station (STA), a device, or a terminal in some embodiments. Wireless device 110 includes transceiver 1910, processing circuitry 1920, and memory 1930. In some embodiments, transceiver 1910 facilitates transmitting wireless signals to and receiving wireless signals from network node 115 (e.g., via antenna 1940), processing circuitry 1920 executes instructions to provide some or all of the functionality described above as being provided by wireless device 110, and memory 1930 stores the instructions executed by processing circuitry 1920.

Processing circuitry 1920 may include any suitable combination of hardware and software implemented in one or more modules to execute instructions and manipulate data to perform some or all of the described functions of wireless device 110, such as the functions of wireless device 110 described above in relation to FIGS. 1-18. In some embodiments, processing circuitry 1920 may include, for example, one or more computers, one or more CPUs, one or more microprocessors, one or more applications, one or more ASICs, one or more FPGAs, and/or other logic.

Memory 1930 is generally operable to store instructions, such as a computer program, software, an application including one or more of logic, rules, algorithms, code, tables, etc. and/or other instructions capable of being executed by a processor. Examples of memory 1930 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information, data, and/or instructions that may be used by processing circuitry 1920.

Other embodiments of wireless device 110 may include additional components beyond those shown in FIG. 19 that may be responsible for providing certain aspects of the wireless device's functionality, including any of the functionality described above and/or any additional functionality (including any functionality necessary to support the solution described above). As just one example, wireless device 110 may include input devices and circuits, output devices, and one or more synchronization units or circuits, which may be part of the processing circuitry 1920. Input devices include mechanisms for entry of data into wireless device 110. For example, input devices may include input mechanisms, such as a microphone, input elements, a display, etc. Output devices may include mechanisms for outputting data in audio, video and/or hard copy format. For example, output devices may include a speaker, a display, etc.

Figure 20:
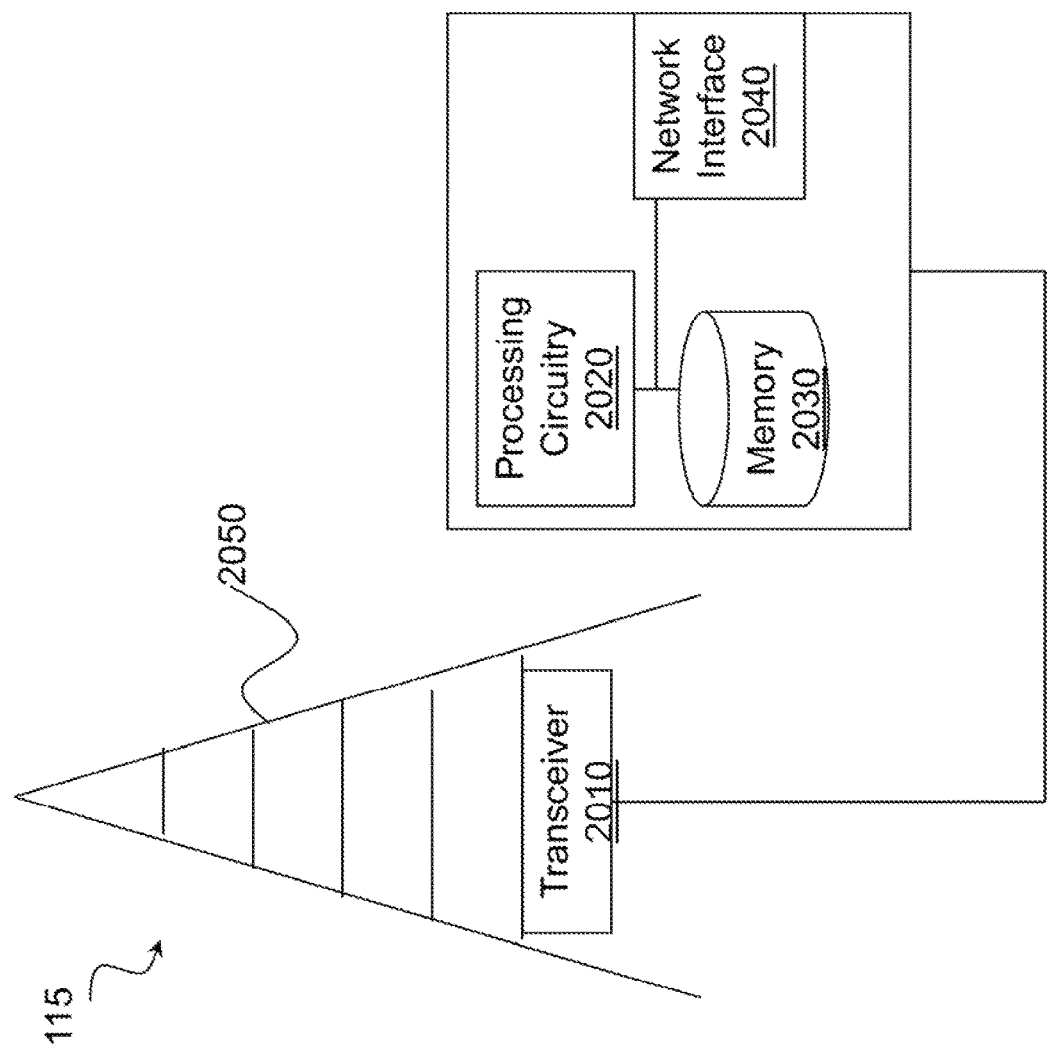
FIG. 20 is a block schematic of an exemplary network node, in accordance with certain embodiments.

FIG. 20 is a block schematic of an exemplary network node, in accordance with certain embodiments. Network node 115 may be any type of radio network node or any network node that communicates with a UE and/or with another network node. Examples of network node 115 include an eNodeB, a gNB, a node B, a base station, a wireless access point (e.g., a Wi-Fi access point), a low power node, a base transceiver station (BTS), relay, donor node controlling relay, transmission points, transmission nodes, remote RF unit (RRU), remote radio head (RRH), multi-standard radio (MSR) radio node such as MSR BS, nodes in distributed antenna system (DAS), O&M, OSS, SON, positioning node (e.g., E-SMLC), MDT, or any other suitable network node. Network nodes 115 may be deployed throughout network 400 as a homogenous deployment, heterogeneous deployment, or mixed deployment. A homogeneous deployment may generally describe a deployment made up of the same (or similar) type of network nodes 115 and/or similar coverage and cell sizes and inter-site distances. A heterogeneous deployment may generally describe deployments using a variety of types of network nodes 115 having different cell sizes, transmit powers, capacities, and inter-site distances. For example, a heterogeneous deployment may include a plurality of low-power nodes placed throughout a macro-cell layout. Mixed deployments may include a mix of homogenous portions and heterogeneous portions.

Network node 115 may include one or more of transceiver 2010, processing circuitry 2020, memory 2030, and network interface 2040. In some embodiments, transceiver 2010 facilitates transmitting wireless signals to and receiving wireless signals from wireless device 110 (e.g., via antenna 2050), processing circuitry 2020 executes instructions to provide some or all of the functionality described above as being provided by a network node 115, memory 2030 stores the instructions executed by processing circuitry 2020, and network interface 2040 communicates signals to backend network components, such as a gateway, switch, router, Internet, Public Switched Telephone Network (PSTN), core network nodes or radio network controllers 130, etc.

Processing circuitry 2020 may include any suitable combination of hardware and software implemented in one or more modules to execute instructions and manipulate data to perform some or all of the described functions of network node 115, such as those described above in relation to FIGS. 1-18 above. In some embodiments, processing circuitry 2020 may include, for example, one or more computers, one or more CPUs, one or more microprocessors, one or more applications, one or more ASICs, one or more FPGAs, and/or other logic.

Memory 2030 is generally operable to store instructions, such as a computer program, software, an application including one or more of logic, rules, algorithms, code, tables, etc. and/or other instructions capable of being executed by a processor. Examples of memory 2030 include computer memory (for example, RAM or ROM), mass storage media (for example, a hard disk), removable storage media (for example, a CD or a DVD), and/or or any other volatile or non-volatile, non-transitory computer-readable and/or computer-executable memory devices that store information.

In some embodiments, network interface 2040 is communicatively coupled to processing circuitry 2020 and may refer to any suitable device operable to receive input for network node 115, send output from network node 115, perform suitable processing of the input or output or both, communicate to other devices, or any combination of the preceding Network interface 2040 may include appropriate hardware (e.g., port, modem, network interface card, etc.) and software, including protocol conversion and data processing capabilities, to communicate through a network.

Other embodiments of network node 115 may include additional components beyond those shown in FIG. 20 that may be responsible for providing certain aspects of the radio network node's functionality, including any of the functionality described above and/or any additional functionality (including any functionality necessary to support the solutions described above). The various different types of network nodes may include components having the same physical hardware but configured (e.g., via programming) to support different radio access technologies, or may represent partly or entirely different physical components.

Figure 21:
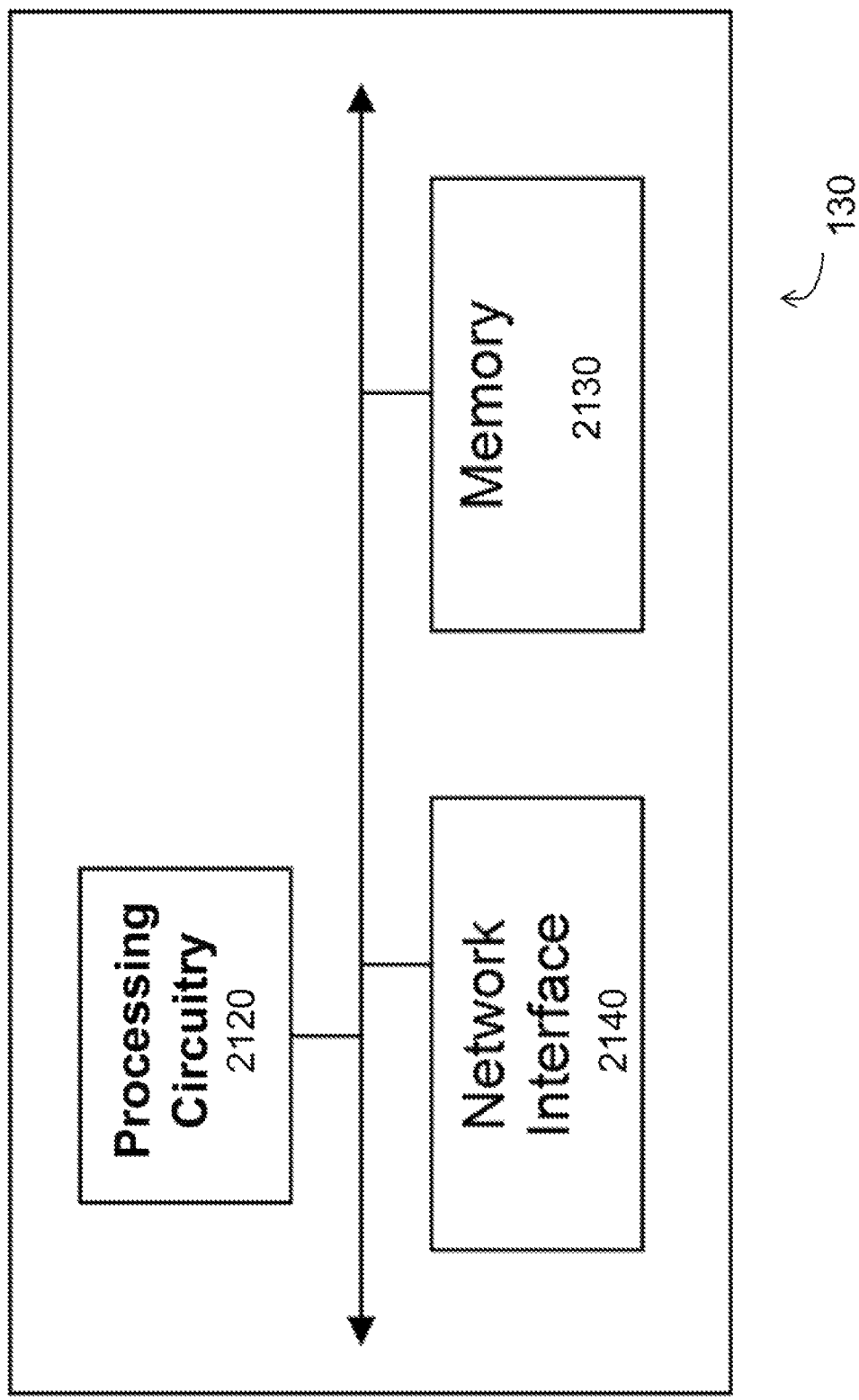
FIG. 21 is a block schematic of an exemplary radio network controller or core network node, in accordance with certain embodiments.

FIG. 21 is a block schematic of an exemplary radio network controller 120 or core network node 130, in accordance with certain embodiments. Examples of network nodes can include a mobile switching center (MSC), a serving GPRS support node (SGSN), a mobility management entity (MME), a radio network controller (RNC), a base station controller (BSC), and so on. The radio network controller or core network node 130 includes processing circuitry 2120, memory 2130, and network interface 2140. In some embodiments, processing circuitry 2120 executes instructions to provide some or all of the functionality described above as being provided by the network node, memory 2130 stores the instructions executed by processing circuitry 2120, and network interface 2140 communicates signals to any suitable node, such as a gateway, switch, router, Internet, Public Switched Telephone Network (PSTN), network nodes 115, radio network controllers or core network nodes 130, etc.

Processing circuitry 2120 may include any suitable combination of hardware and software implemented in one or more modules to execute instructions and manipulate data to perform some or all of the described functions of the radio network controller or core network node 130. In some embodiments, processing circuitry 2120 may include, for example, one or more computers, one or more CPUs, one or more microprocessors, one or more applications, one or more ASICs, one or more FPGAs, and/or other logic.

Memory 2130 is generally operable to store instructions, such as a computer program, software, an application including one or more of logic, rules, algorithms, code, tables, etc. and/or other instructions capable of being executed by a processor. Examples of memory 2130 include computer memory (for example, RAM or ROM), mass storage media (for example, a hard disk), removable storage media (for example, a CD or a DVD), and/or or any other volatile or non-volatile, non-transitory computer-readable and/or computer-executable memory devices that store information.

In some embodiments, network interface 2140 is communicatively coupled to processing circuitry 2120 and may refer to any suitable device operable to receive input for the network node, send output from the network node, perform suitable processing of the input or output or both, communicate to other devices, or any combination of the preceding. Network interface 2140 may include appropriate hardware (e.g., port, modem, network interface card, etc.) and software, including protocol conversion and data processing capabilities, to communicate through a network.

Other embodiments of the network node may include additional components beyond those shown in FIG. 21 that may be responsible for providing certain aspects of the network node's functionality, including any of the functionality described above and/or any additional functionality (including any functionality necessary to support the solution described above).

Figure 22:
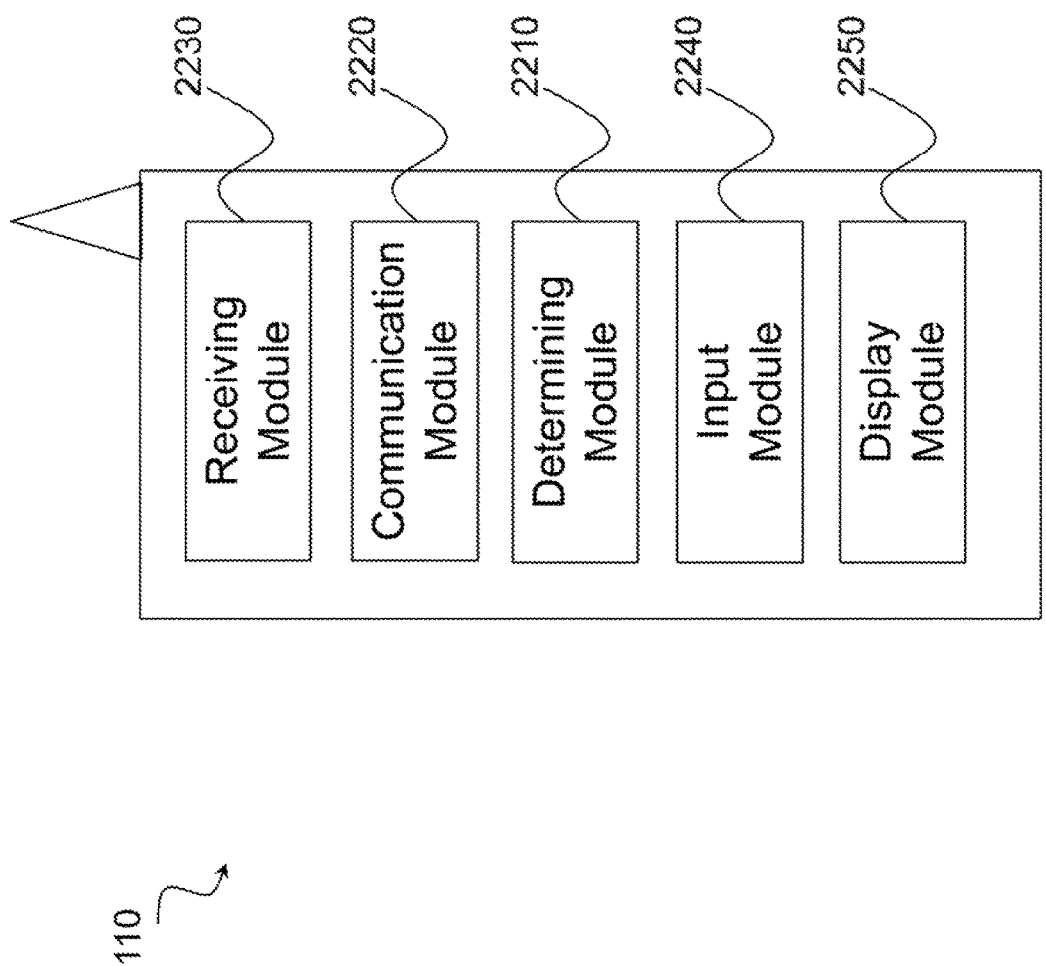
FIG. 22 is a block schematic of an exemplary wireless device, in accordance with certain embodiments.

FIG. 22 is a block schematic of an exemplary wireless device, in accordance with certain embodiments. Wireless device 110 may include one or more modules. For example, wireless device 110 may include a determining module 2210, a communication module 2220, a receiving module 2230, an input module 2240, a display module 2250, and any other suitable modules. In some embodiments, one or more of determining module 2210, communication module 2220, receiving module 2230, input module 2240, display module 2250, or any other suitable module may be implemented using one or more processors, such as processing circuitry 1620 described above in relation to FIG. 19. In certain embodiments, the functions of two or more of the various modules may be combined into a single module. Wireless device 110 may perform the methods for measurements for frequency hopping systems described above with respect to FIGS. 1-18.

Determining module 2210 may perform the processing functions of wireless device 110. For example, determining module 2210 may identify a configuration of a coordinated measurement occasion. As another example, determining module 2210 may, during the coordinated measurement occasion, perform one or more measurements with respect to a plurality of reference signals transmitted from different cells, in accordance with the identified configuration. As still another example, determining module 2210 may identify the coordinated measurement occasion, wherein the one or more measurements are performed in response to identifying the coordinated measurement occasion. As yet another example, determining module 2210 may distinguish between the reference signals transmitted from the different cells based on physical cell identifiers transmitted in conjunction with the reference signals. As another example, determining module 2210 may determine the configuration of the coordinated measurement occasion. As another example, determining module 2210 may access the configuration of the coordinated measurement occasion from a memory of the wireless device.

Determining module 2210 may include or be included in one or more processors, such as processing circuitry 1620 described above in relation to FIG. 19. Determining module 2210 may include analog and/or digital circuitry configured to perform any of the functions of determining module 2210 and/or processing circuitry 1920 described above. The functions of determining module 2210 described above may, in certain embodiments, be performed in one or more distinct modules.

Communication module 2220 may perform the transmission functions of wireless device 110. For example, communication module 2220 may communicate according to a predetermined frequency hopping pattern during times outside of the coordinated measurement occasion, and deviates from the predetermined frequency hopping pattern to the one or more common frequencies during the coordinated measurement occasion. Communication module 2220 may transmit messages to one or more of network nodes 115 of network 400. Communication module 2220 may include a transmitter and/or a transceiver, such as transceiver 1910 described above in relation to FIG. 19. Communication module 2220 may include circuitry configured to wirelessly transmit messages and/or signals. In particular embodiments, communication module 2220 may receive messages and/or signals for transmission from determining module 2210. In certain embodiments, the functions of communication module 2220 described above may be performed in one or more distinct modules.

Receiving module 2230 may perform the receiving functions of wireless device 110. As one example, receiving module 2230 may receive reference signals. As another example, receiving module 2230 may receive reference signals according to distinct or random timing offsets within the coordinated measurement occasion to avoid collisions between the reference signals. As still another example, receiving module 2230 may receive an indication of the configuration of the coordinated measurement occasion. Receiving module 2230 may include a receiver and/or a transceiver, such as transceiver 1910 described above in relation to FIG. 19. Receiving module 2230 may include circuitry configured to wirelessly receive messages and/or signals. In particular embodiments, receiving module 2230 may communicate received messages and/or signals to determining module 2210. The functions of receiving module 2230 described above may, in certain embodiments, be performed in one or more distinct modules.

Input module 2240 may receive user input intended for wireless device 110. For example, the input module may receive key presses, button presses, touches, swipes, audio signals, video signals, and/or any other appropriate signals. The input module may include one or more keys, buttons, levers, switches, touchscreens, microphones, and/or cameras. The input module may communicate received signals to determining module 2210. The functions of input module 2240 described above may, in certain embodiments, be performed in one or more distinct modules.

Display module 2250 may present signals on a display of wireless device 110. Display module 2250 may include the display and/or any appropriate circuitry and hardware configured to present signals on the display. Display module 2250 may receive signals to present on the display from determining module 2210. The functions of display module 2250 described above may, in certain embodiments, be performed in one or more distinct modules.

Determining module 2210, communication module 2220, receiving module 2230, input module 2240, and display module 2250 may include any suitable configuration of hardware and/or software. Wireless device 110 may include additional modules beyond those shown in FIG. 19 that may be responsible for providing any suitable functionality, including any of the functionality described above and/or any additional functionality (including any functionality necessary to support the various solutions described herein).

FIG. 23 is a block schematic of an exemplary network node 115, in accordance with certain embodiments. Network node 115 may include one or more modules. For example, network node 115 may include determining module 2310, communication module 2320, receiving module 2330, and any other suitable modules. In some embodiments, one or more of determining module 2310, communication module 2320, receiving module 2330, or any other suitable module may be implemented using one or more processors, such as processing circuitry 1720 described above in relation to FIG. 20. In certain embodiments, the functions of two or more of the various modules may be combined into a single module. Network node 115 may perform the methods for measurements of frequency hopping systems described above with respect to FIGS. 1-18.

Determining module 2310 may perform the processing functions of network node 115. For example, determining module 2310 may determine a configuration for at least one coordinated measurement occasion, the configuration defining a common time interval and one or more common frequencies for transmission of a plurality of reference signals by different cells during the coordinated measurement occasion, wherein each of the different cells transmits at least one of the plurality of reference signals. As another example, determining module 2310 may perform listen-before-talk within the coordinated measurement occasion to avoid collisions between the reference signals. As still another example, determining module 2310 may select a frequency to use to transmit its associated reference signal during the coordinated measurement occasion from the one or more common frequencies defined in the configuration. As yet another example, determining module 2310 may obtain a configuration for at least one coordinated measurement occasion, the configuration defining a common time interval and one or more common frequencies for transmission of a plurality of reference signals by different cells during the coordinated measurement occasion. As another example, determining module 2310 may identify the coordinated measurement occasion.

Determining module 2310 may include or be included in one or more processors, such as processing circuitry 2020 described above in relation to FIG. 20. Determining module 2310 may include analog and/or digital circuitry configured to perform any of the functions of determining module 2310 and/or processing circuitry 2020 described above. The functions of determining module 2310 may, in certain embodiments, be performed in one or more distinct modules.

Communication module 2320 may perform the transmission functions of network node 115. For example, communication module 2320 may communicate a configuration to different cells. As another example, communication module 2320 may communicate according to a different predetermined frequency hopping pattern during times outside of the coordinated measurement occasion, and deviate from its predetermined frequency hopping pattern to one of the one or more common frequencies during the coordinated measurement occasion. As still another example, communication module 2320 may transmit a reference signal during the at least one coordinated measurement occasion according to the obtained configuration. As yet another example, communication module 2320 may transmit reference signals according to distinct or random timing offsets within the coordinated measurement occasion to avoid collisions between the reference signals. As another example, communication module 2320 may provide an indication of the configuration for the at least one coordinated measurement occasion to one or more wireless devices. As another example, communication module 2320 may transmit a physical cell identifier in conjunction with the reference signal transmitted according to the obtained configuration to enable the one or more wireless devices to distinguish between the plurality of reference signals transmitted by the different cells.

Communication module 2320 may transmit messages to one or more of wireless devices 110. Communication module 2320 may include a transmitter and/or a transceiver, such as transceiver 2010 described above in relation to FIG. 20. Communication module 2320 may include circuitry configured to wirelessly transmit messages and/or signals. In particular embodiments, communication module 2320 may receive messages and/or signals for transmission from determining module 2310 or any other module. The functions of communication module 2320 may, in certain embodiments, be performed in one or more distinct modules.

Receiving module 2330 may perform the receiving functions of network node 115. For example, receiving module 2330 may receive the configuration for the at least one coordinated measurement occasion from another network node.

Receiving module 2330 may receive any suitable information from a wireless device. Receiving module 2330 may include a receiver and/or a transceiver, such as transceiver 2010 described above in relation to FIG. 20. Receiving module 2330 may include circuitry configured to wirelessly receive messages and/or signals. In particular embodiments, receiving module 2330 may communicate received messages and/or signals to determining module 2310 or any other suitable module. The functions of receiving module 2330 may, in certain embodiments, be performed in one or more distinct modules.

Determining module 2310, communication module 2320, and receiving module 2330 may include any suitable configuration of hardware and/or software. Network node 115 may include additional modules beyond those shown in FIG. 20 that may be responsible for providing any suitable functionality, including any of the functionality described above and/or any additional functionality (including any functionality necessary to support the various solutions described herein).

While the disclosed subject matter has been presented above with reference to various embodiments, it will be understood that various changes in form and details may be made to the described embodiments without departing from the overall scope of the disclosed subject matter.

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods described herein without departing from the scope of the disclosure. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

Abbreviations used in the preceding description include:
3GPP 3$^{rd}$ Generation Partnership Project
AP Access Point
ASIC Application Specific Integrated Circuit
BS Base Station
BSC Base Station Controller
BTS Base Transceiver Station
CD Compact Disk
CPE Customer Premises Equipment
CPU Central Processing Unit
CSI Channel State Information
CSI-RS Channel State Information Reference Signal
D2D Device-to-device
DAA Detect and Avoid
DAS Distributed Antenna System
DCI Downlink Control Information
DL Downlink
DRS Discovery Reference Signal
DVD Digital Video Disk
eNB evolved Node B
EC-GSM Extended-Coverage Global System for Mobile Communications
eLAA Enhanced Licensed Assisted Access
E-MTC Enhanced Machine-Type Communication
E-SMLC Evolved Serving Mobile Location Center
ETSI European Telecommunications Standards Institute
E-UTRA Evolved Universal Terrestrial Radio Access
E-UTRAN Evolved Universal Terrestrial Radio Access Network
FDD Frequency Division Duplex
FPGA Field Programmable Gate Array
HARQ Hybrid Automatic Repeat REquest
IoT Internet of Things
IP Internet Protocol
LAA Licensed Assisted Access
LAN Local Area Network
LBT Listen-Before-Talk
LEE Laptop Embedded Equipment
LME Laptop Mounted Equipment
LTE Long Term Evolution
M2M Machine-to-Machine
MAC Medium Access Control
MAN Metropolitan Area Network
MCE Multi-cell/multicast Coordination Entity
MCS Modulation level and coding scheme
MDT Minimization of Drive Test
MFA MulteFire Alliance
MME Mobility Management Entity
MRS Mobility Reference Signal
MSC Mobile Switching Center
MSR Multi-standard Radio
MTC Machine-Type Communication
NAS Non-Access Stratum
NB-IoT Narrow band Internet of Things
NR New Radio
O&M Operations and Management
OSS Operations Support System
PBCH Physical Broadcast Channel
PCID Physical Cell Identity
PDSCH Physical Downlink Shared Channel
PRB Physical Resource Block
PSD Power Spectral Density
PSS Primary Synchronization Signal
PSTN Public Switched Telephone Network
PUSCH Physical Uplink Shared Channel
RACH Random Access Channel
RAM Random Access Memory
RAN Radio Access Network
RAT Radio Access Technology
RNC Radio Network Controller
ROM Read-Only Memory
RRC Radio Resource Control
RRH Remote Radio Head
RRU Remote Radio Unit
SIB System Information Block
SINR Signal-to-Interference-plus-Noise Ratio
SON Self-Organizing Network
SS Synchronization Signal
SSB Synchronization Signal/Physical Broadcast Channel Block
SSS Secondary Synchronization Signal
TDD Time Division Duplex
TR Transmission Resources
TRP Transmission/Reception Point
TRS Tracking Reference Signal
TTI Transmission Time Interval
UCI Uplink Control Information
UE User Equipment
UL Uplink
WAN Wide Area Network
WLAN Wireless Local Area Network

The invention claimed is:
1. A method in a wireless device, comprising:
identifying a configuration of a coordinated measurement occasion; and
during the coordinated measurement occasion, performing one or more measurements with respect to a plu- rality of reference signals transmitted from different cells, in accordance with the identified configuration, wherein:

each of the different cells is associated with at least one of the plurality of reference signals;

the configuration defines a common time interval and one or more common frequencies for the different cells to transmit their respective associated reference signal during the coordinated measurement occasion; and the wireless device communicates according to a predetermined frequency hopping pattern during times outside of the coordinated measurement occasion, and deviates from the predetermined frequency hopping pattern to the one or more common frequencies during the coordinated measurement occasion.

2. The method of claim 1, wherein the plurality of reference signals comprises discovery reference signals.

3. The method of claim 1, further comprising identifying the coordinated measurement occasion, wherein the one or more measurements are performed in response to identifying the coordinated measurement occasion.

4. The method of claim 1, wherein each of the different cells communicates according to a different predetermined frequency hopping pattern during times outside of the coordinated measurement occasion, and at least one of the different cells deviates from its predetermined frequency hopping pattern to one of the one or more common frequencies during the coordinated measurement occasion.

5. The method of claim 1, wherein the configuration further defines a frequency hopping pattern for changing the common frequency between different coordinated measurement occasions.

6. The method of claim 1, further comprising distinguishing between the reference signals transmitted from the different cells based on physical cell identifiers transmitted in conjunction with the reference signals.

7. The method of claim 1, wherein the one or more different cells perform listen-before-talk within the coordinated measurement occasion to avoid collisions between the reference signals.

8. The method of claim 1, wherein the different cells transmit the reference signals according to distinct or random timing offsets within the coordinated measurement occasion to avoid collisions between the reference signals.

9. The method of claim 1, wherein each of the different cells selects a frequency to use to transmit its associated reference signal during the coordinated measurement occasion from the one or more common frequencies defined in the configuration.

10. The method of claim 1, wherein the common frequency is a native frequency of at least one of the different cells.

11. The method of claim 10, wherein the native frequency is a frequency within a frequency hopping pattern of the at least one of the different cells.

12. The method of claim 1, wherein the plurality of reference signals are transmitted from different cells by frequency hopping patterns.

13. A method in a network node, comprising:

determining a configuration for at least one coordinated measurement occasion, the configuration defining a common time interval and one or more common frequencies for transmission of a plurality of reference signals by different cells during the coordinated measurement occasion, wherein each of the different cells transmits at least one of the plurality of reference signals; and communicating the configuration to the different cells, wherein each of the different cells communicates according to a different predetermined frequency hopping pattern during times outside of the coordinated measurement occasion, and at least one of the different cells deviates from its predetermined frequency hopping pattern to one of the one or more common frequencies during the coordinated measurement occasion.

14. The method of claim 13, wherein the plurality of reference signals comprises discovery reference signals.

15. The method of claim 13, wherein the configuration further defines a frequency hopping pattern for changing the common frequency between different coordinated measurement occasions.

16. The method of claim 13, wherein the one or more different cells perform listen-before-talk within the coordinated measurement occasion to avoid collisions between the reference signals.

17. The method of claim 13, wherein the different cells transmit the reference signals according to distinct or random timing offsets within the coordinated measurement occasion to avoid collisions between the reference signals.

18. The method of claim 13, wherein each of the different cells selects a frequency to use to transmit its associated reference signal during the coordinated measurement occasion from the one or more common frequencies defined in the configuration.

19. The method of claim 18, wherein each of the different cells selects the frequency to use to transmit its associated reference signal during the coordinated measurements occasion independently such that the plurality of reference signals are transmitted on different frequencies.

20. The method of claim 13, wherein the plurality of reference signals are transmitted from different cells by frequency hopping patterns.

21. A wireless device, comprising:

processing circuitry, the processing circuitry configured to:

identify a configuration of a coordinated measurement occasion; and during the coordinated measurement occasion, perform one or more measurements with respect to a plurality of reference signals transmitted from different cells, in accordance with the identified configuration, wherein:

each of the different cells is associated with at least one of the plurality of reference signals;

the configuration defines a common time interval and one or more common frequencies for the different cells to transmit their respective associated reference signal during the coordinated measurement occasion; and the processing circuitry is configured to communicate, via a transmitter, according to a predetermined frequency hopping pattern during times outside of the coordinated measurement occasion, and deviate from the predetermined frequency hopping pattern to the one or more common frequencies during the coordinated measurement occasion.

22. The wireless device of claim 21, wherein the plurality of reference signals comprises discovery reference signals.

23. The wireless device of claim 21, wherein:
the processing circuitry is further configured to identify the coordinated measurement occasion; and
the processing circuitry is further configured to perform the one or more measurements in response to identifying the coordinated measurement occasion.

24. The wireless device of claim 21, wherein each of the different cells communicates according to a different predetermined frequency hopping pattern during times outside of the coordinated measurement occasion, and at least one of the different cells deviates from its predetermined frequency hopping pattern to one of the one or more common frequencies during the coordinated measurement occasion.

25. The wireless device of claim 21, wherein the configuration further defines a frequency hopping pattern for changing the common frequency between different coordinated measurement occasions.

26. The wireless device of claim 21, wherein the processing circuitry is further configured to distinguish between the reference signals transmitted from the different cells based on physical cell identifiers transmitted in conjunction with the reference signals.

27. The wireless device of claim 21, wherein the one or more different cells perform listen-before-talk within the coordinated measurement occasion to avoid collisions between the reference signals.

28. The wireless device of claim 21, wherein the different cells transmit the reference signals according to distinct or random timing offsets within the coordinated measurement occasion to avoid collisions between the reference signals.

29. The wireless device of claim 21, wherein each of the different cells selects a frequency to use to transmit its associated reference signal during the coordinated measurement occasion from the one or more common frequencies defined in the configuration.

30. The wireless device of claim 29, wherein each of the different cells selects the frequency to use to transmit its associated reference signal during the coordinated measurements occasion independently such that the plurality of reference signals are transmitted on different frequencies.

31. The wireless device of claim 21, wherein the common frequency is a native frequency of at least one of the different cells.

32. The wireless device of claim 31, wherein the native frequency is a frequency within a frequency hopping pattern of the at least one of the different cells.

33. The wireless device of claim 21, wherein the processing circuitry configured to identify the configuration of the coordinated measurement occasion comprises processing circuitry configured to perform one of:
determine the configuration of the coordinated measurement occasion;
access the configuration of the coordinated measurement occasion from a memory of the wireless device; and
receive, via a receiver, an indication of the configuration of the coordinated measurement occasion.

34. The wireless device of claim 33, wherein the wireless device is preconfigured with the configuration of the coordinated measurement occasion.

35. The wireless device of claim 21, wherein the plurality of reference signals are transmitted from different cells by frequency hopping patterns.

36. A network node, comprising:
processing circuitry, the processing circuitry configured to:
determine a configuration for at least one coordinated measurement occasion, the configuration defining a common time interval and one or more common frequencies for transmission of a plurality of reference signals by different cells during the coordinated measurement occasion, wherein each of the different cells transmits at least one of the plurality of reference signals; and
communicate the configuration to the different cells,
wherein each of the different cells communicates according to a different predetermined frequency hopping pattern during times outside of the coordinated measurement occasion, and at least one of the different cells deviates from its predetermined frequency hopping pattern to one of the one or more common frequencies during the coordinated measurement occasion.

37. The network node of claim 36, wherein the plurality of reference signals comprises discovery reference signals.

38. The network node of claim 36, wherein the configuration further defines a frequency hopping pattern for changing the common frequency between different coordinated measurement occasions.

39. The network node of claim 36, wherein the one or more different cells perform listen-before-talk within the coordinated measurement occasion to avoid collisions between the reference signals.

40. The network node of claim 36, wherein the different cells transmit the reference signals according to distinct or random timing offsets within the coordinated measurement occasion to avoid collisions between the reference signals.

41. The network node of claim 36, wherein each of the different cells selects a frequency to use to transmit its associated reference signal during the coordinated measurement occasion from the one or more common frequencies defined in the configuration.

42. The network node of claim 41, wherein each of the different cells selects the frequency to use to transmit its associated reference signal during the coordinated measurements occasion independently such that the plurality of reference signals are transmitted on different frequencies.

43. The network node of claim 36, wherein the plurality of reference signals are transmitted from different cells by frequency hopping patterns.

* * * * *